(12) United States Patent
Yuan et al.

(10) Patent No.: US 12,026,014 B2
(45) Date of Patent: *Jul. 2, 2024

(54) DISPLAY APPARATUS AND INTERFACE DISPLAY METHOD

(71) Applicant: Hisense Visual Technology Co., Ltd., Shandong (CN)

(72) Inventors: Yanmei Yuan, Shandong (CN); Donghang Li, Shandong (CN); Guanghai Zhuang, Shandong (CN); Chenglong Liu, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 135 days.

This patent is subject to a terminal disclaimer.

(21) Appl. No.: 17/696,091

(22) Filed: Mar. 16, 2022

(65) Prior Publication Data

US 2022/0206533 A1 Jun. 30, 2022

Related U.S. Application Data

(63) Continuation of application No. PCT/CN2021/080569, filed on Mar. 12, 2021.

(30) Foreign Application Priority Data

Mar. 13, 2020 (CN) .......................... 202010177817.1
Apr. 16, 2020 (CN) .......................... 202010301682.5

(51) Int. Cl.
*G06F 1/16* (2006.01)
(52) U.S. Cl.
CPC .... *G06F 1/1637* (2013.01); *G06F 2200/1614* (2013.01); *G06F 2200/1637* (2013.01)

(58) Field of Classification Search
CPC .............. G06T 3/60; G09G 2340/0492; G06F 2200/1614
See application file for complete search history.

(56) References Cited

U.S. PATENT DOCUMENTS

| | | | |
|---|---|---|---|
| 2008/0105070 A1 | 5/2008 | Sawai et al. | |
| 2010/0066763 A1* | 3/2010 | MacDougall | G06F 1/1626 345/656 |
| 2012/0229370 A1 | 9/2012 | Stroffolino et al. | |

(Continued)

FOREIGN PATENT DOCUMENTS

| | | |
|---|---|---|
| CN | 101102358 A | 1/2008 |
| CN | 101236722 A | 8/2008 |

(Continued)

OTHER PUBLICATIONS

Chinese Office Action, dated Jan. 19, 2023, from Chinese App. No. 202010301682.5.

(Continued)

*Primary Examiner* — Samantha (Yuehan) Wang
(74) *Attorney, Agent, or Firm* — ANOVA LAW GROUP, PLLC

(57) ABSTRACT

Disclosed are a display apparatus and an interface display method. The display apparatus includes a display, a rotating assembly in connection with the display and configured to drive the display to rotate to a rotation station, and a controller in communication with the display and the rotating assembly.

20 Claims, 17 Drawing Sheets

(56) References Cited

U.S. PATENT DOCUMENTS

2017/0262053 A1      9/2017  Noh
2021/0049984 A1*     2/2021  Cain ..................... G06F 1/1694
2021/0311592 A1*    10/2021  Liu ........................ G06F 9/451

FOREIGN PATENT DOCUMENTS

| | | | |
|---|---|---|---|
| CN | 201142204 | Y | 10/2008 |
| CN | 101887658 | A | 11/2010 |
| CN | 103917940 | A | 7/2014 |
| CN | 105150951 | A | 12/2015 |
| CN | 105260004 | A | 1/2016 |
| CN | 105723322 | A | 6/2016 |
| CN | 106371719 | A | 2/2017 |
| CN | 106814989 | A | 6/2017 |
| CN | 106888312 | A | 6/2017 |
| CN | 106933468 | A | 7/2017 |
| CN | 109270857 | A * | 1/2019 ........... G05B 19/042 |
| CN | 109270857 | A | 1/2019 |
| CN | 110045753 | A | 7/2019 |
| CN | 110740364 | A | 1/2020 |
| CN | 112104916 | A | 12/2020 |

OTHER PUBLICATIONS

International Search Report, dated Jun. 1, 2021, from PCT/CN2021/080569 filed Mar. 12, 2021.

* cited by examiner

DISPLAY APPARATUS AND INTERFACE DISPLAY METHOD

CROSS-REFERENCE TO RELATED APPLICATIONS

This application is a continuation application of International Application No. PCT/CN2021/080569 filed on Mar. 12, 2021, which claims the priorities of the Chinese patent application No. 202010177817.1 filed on Mar. 13, 2020, and the Chinese patent application No. 202010301682.5 filed on Apr. 16, 2020. The entire contents of the above applications are incorporated herein by reference.

FIELD

The present application relates to rotatable display apparatuses, in particular to a display apparatus and an interface display method.

BACKGROUND

A smart television has an independent operation system, and supports function extension. Various applications may be installed in the smart television according to requirements of users, for example, social applications such as a traditional video application and a short video, and reading applications such as cartoon and book. These applications may utilize a display of the smart television to display an application picture, so as to provide rich media resources for the smart television. Meanwhile, the smart television may further have data interaction and resource sharing with different devices. For example, the smart television may be connected with a mobile phone according to wireless communication manner such as a local area network and Bluetooth, so as to play a resource from the mobile phone or directly display a picture on the mobile phone in a cast mode.

However, since different applications or media resources of different sources correspond to different picture proportions, the smart television usually displays pictures different from a traditional video proportion. For example, a video resource made through a terminal such as a mobile phone is generally a vertical media resource with an aspect ratio being 9:16, 9:18, 3:4 or other proportions, while a picture provided by a reading application is a vertical resource similar to an aspect ratio of a book. The aspect ratio of a display screen of the smart television is generally a horizontal state such as 16:9 and 16:10. Therefore, when the vertical media resources such as the short video and cartoon are displayed through the smart television, a vertical media resource picture cannot be properly displayed due to the fact that the picture proportion is not matched with a display screen proportion. The vertical media resource picture usually needs to be scaled for complete displaying, resulting in display space waste and poor user experience.

SUMMARY

An embodiment of the present application provides a display apparatus, including: a display; a rotating assembly in connection with the display and configured to drive the display to rotate to a rotation state, where the rotation state includes a horizontal state, a portrait state and at least one intermediate state during rotation of the display except the horizontal state and the portrait state; and a controller, in communication with the display and the rotating assembly and configured to: in response to starting an application in the display apparatus, detect a display direction supported by the application and a current rotation state of the display; in response to the display direction supported by the application being consistent with the current rotation state, control the display to present an application page of the application; and in response to the display direction supported by the application being inconsistent with the current rotation state, cause the rotating assembly to drive the display to rotate, to enable a rotation state of the display to be consistent with the display direction supported by the application.

An embodiment of the present application provides an interface display method for a display apparatus, including: in response to starting an application in the display apparatus, detecting a display direction supported by the application and a current rotation state of a display of the display apparatus, wherein the display apparatus includes a rotating assembly configured to drive the display to rotate to a rotation state, where the rotation state includes a horizontal state, a portrait state and at least one intermediate state during rotation of the display except the horizontal state and the portrait state; in response to the display direction supported by the application being consistent with the current rotation state, controlling the display to present an application page of the application; and in response to the display direction supported by the application being inconsistent with the current rotation state, causing the rotating assembly of the display apparatus to drive the display to rotate to enable a rotation state of the display to be consistent with the display direction supported by the application.

An embodiment of the present application provides a non-transitory computer storage medium, where the computer storage medium stores computer instructions which are configured to cause the computer to: in response to starting an application in a display apparatus, detect a display direction supported by the application and a current rotation state of a display of the display apparatus, wherein the display apparatus includes a rotating assembly configured to drive the display to rotate to a rotation state, where the rotation state includes a horizontal state, a portrait state and at least one intermediate state during rotation of the display except the horizontal state and the portrait state; in response to the display direction supported by the application being consistent with the current rotation state, control the display to present an application page of the application; and in response to the display direction supported by the application being inconsistent with the current rotation state, cause the rotating assembly of the display apparatus to drive the display to rotate to enable a rotation state of the display to be consistent with the display direction supported by the application.

DETAILED DESCRIPTION OF THE EMBODIMENTS

Figure 1A:
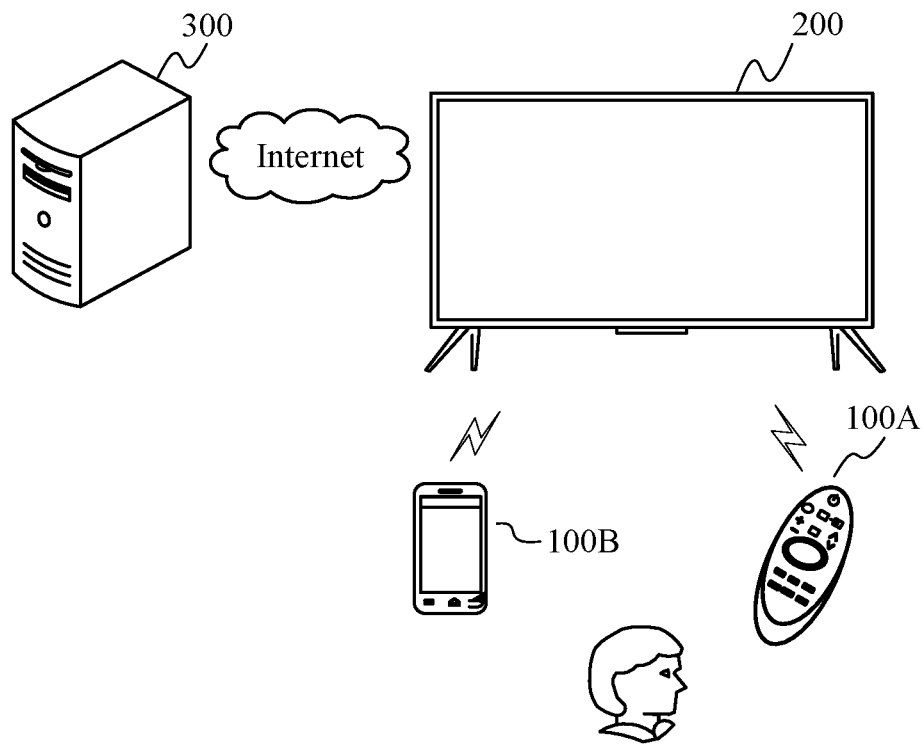
FIG. 1A is a scenario diagram of a display apparatus according to the present application.

In order to make those skilled in the art understand the present application better, the embodiments of the present application will be described below clearly and completely with reference to the drawings in the embodiments of the present application. Obviously, the described embodiments are only part of the embodiments of the present application, but not all the embodiments. On the basis of the embodiments in the present application, all other embodiments obtained by those skilled in the art without inventive efforts should fall within the protection scope of the present application.

A rotatable display apparatus is a new smart electronic device (a rotatable television is taken as an example hereafter), and mainly includes a display and a rotating assembly. The display is fixed onto a wall or a bracket through a rotating assembly of the display apparatus, a placing angle of the display may be adjusted through the rotating assembly, so as to adapt to display pictures with different aspect ratios. A user may display a horizontal media resource with an aspect ratio being greater than 1 under a landscape state, and may also display a vertical media resource with an aspect ratio being smaller than 1 under a portrait state. Certainly, when the user clicks a portrait media resource, or enters into a vertical application, or inputs a rotation instruction under the landscape state, the rotatable display apparatus may be rotated from the landscape or horizontal state to the portrait state, and vice versa.

For example, the display is horizontally placed in most cases, so as to display video pictures such as a movie and a teleplay with an aspect ratio being 16:9. When the aspect ratio of the video pictures is pictures of a short video and cartoon being 9:16, the horizontally placed display needs to scale the picture, and black bars are displayed on two sides of the display. Therefore, the display may be vertically placed through the rotating assembly, so as to adapt to the video pictures with the proportion of 9:16.

A rotatable television supports many applications. In order to facilitate user watching, a signal source of the television for a starting process may be set by setting a starting mode. For example, in order to obtain a viewing experience of a traditional television, the signal source of the television when starting the television may be set to be a live broadcast signal, so that the television directly enters into a live broadcast state after being started. The user may set the signal source to be any application through a setting application. Because different applications support different display postures, the posture of the television during starting should be adapted to the application serving as the signal source for starting, and thus the picture corresponding to the signal source application may be properly displayed.

However, when the user watches the television, the posture of the display of the rotatable television will be adjusted according to requirements, and the display is still kept at the adjusted posture during turned off. For example, when watching a short video or cartoon with the aspect ratio being smaller than 1 through the television, a display is switched to a vertical state for a user to watch, and shuts down under the vertical state.

Because a plurality of applications may be installed on the display apparatus 200, applications among the plurality of applications supporting the landscape state or the portrait state are usually different. In one implementation, the applications include a landscape application which only supports the landscape state, a portrait application which only supports the portrait state, and a compound application which supports both the landscape state and the portrait state. During the live broadcast or being accessed into a live broadcast signal, this type of application only supports the landscape state, this type of application may be regarded as the landscape application. When a short video application, an education or game application (for example, applications usually associated with a mobile device, like Tik Tok) with the aspect ratio being smaller than 1 is played, this type of application only supports the portrait state, namely, this type of application may be regarded as the portrait application. When a browser application and the like are presented on the display, the type of application supports both the landscape state and the portrait state, and this type of application may be regarded as the compound application.

In some embodiments, a signal source may also be regarded as an application.

The rotatable television may rotate the display when receiving a rotation instruction from the user. Certainly, when some users trigger and start an application, the application automatically will cause the display to rotate according to landscape and portrait states supported by the application. Therefore, the present application provides a display apparatus and an interface display method.

In order to facilitate the user to display a target media resource detail page under the different landscape and portrait states and conveniently improve a user view experience of the display apparatus at the different view states, embodiments of the present application provide a display apparatus, a detail page display method and a computer readable non-volatile medium. The display apparatus is a rotatable television, for example. It should be noted that the method provided by the present embodiment is suitable for the rotatable television, and further suitable for other display apparatuses, such as a computer and a tablet computer.

The terms "remote control" used in all the embodiments of the present application refers to a component of an electronic device (such as the display apparatus disclosed in the present application). The component may usually wirelessly control the electronic device in a short distance range. The component may generally be connected with the electronic device by using an infrared and/or radio frequency (RF) signal and/or Bluetooth, and may also include functional modules such as WiFi, wireless USB, Bluetooth and a motion sensor. For example, a handheld touch remote control is to replace most physical built-in hard keys in a general remote control device with a user interface in a touch screen.

FIG. 1A illustrates a scenario diagram of a display apparatus according to some embodiments of the present application. As shown in FIG. 1A, a control device 100 may communicate with the display apparatus 200 in a wired or wireless manner.

The control device 100 is configured to control the display apparatus 200, may receive commands input from a user and convert the commands into instructions that can be recognized and responded by the display apparatus 200, and acts an interaction intermediary role between the user and the display apparatus 200. For example, the user operates a channel up and a channel down key on the control device 100, and the display apparatus 200 responds to the channel up and the channel down operation.

The control device 100 may be a remote control 100A, based on infrared protocol communication or Bluetooth protocol communication and other short range communication manners, etc., to control the display apparatus 200 via wireless or other wired manners. The user may input user commands through keys, voice input, control panel input and the like on the remote control to control the display apparatus 200. For example, the user may input commands through a volume up or a volume down key, a channel control key, an up/down/left/right direction key, a voice input key, a menu key, an power key and the like on the remote control, so as to realize the function of controlling the display apparatus 200.

The control device 100 may also be a smart device, such as a mobile terminal 100B, a tablet computer, a computer and a notebook computer. For example, an application running on the smart device is used to control the display apparatus 200. Through configuration, the application may provide various controls for the user on a screen associated with the smart device through an intuitive user interface (UI).

Exemplarily, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to achieve functions of physical keys, for example, arranged on the remote control 100A by operating various functional keys or virtual controls of the user interface provided on the mobile terminal 100B. Audio and video contents displayed on the mobile terminal 100B may also be transmitted onto the display apparatus 200 so as to realize a synchronous display function.

The display apparatus 200 may provide a broadcast reception function and a network television function that a computer supports. The display apparatus may be implemented as a digital television, a network television, an Internet protocol television (IPTV) and the like.

The display apparatus 200 may be a liquid crystal display, an organic light emitting display, and a projection device. Types, sizes, resolutions, and the like of specific display apparatuses are not limited.

The display apparatus 200 may further have data communication with a server 300 in multiple communication modes. Here, the display apparatus 200 may have communication connection through a local area network (LAN), a wireless local area network (WLAN) or the other networks. The server 300 may provide various contents and interactions for the display apparatus 200. Exemplarily, the display apparatus 200 may send and receive information, for example, receiving electronic program guide (EPG) data, software program updates or accessing a remotely-stored digital media library. The server 300 may be one or more clusters, and may be one or more kinds of servers. Other network service contents such as video on demand and advertising service are provided through the server 300.

Figure 1B:
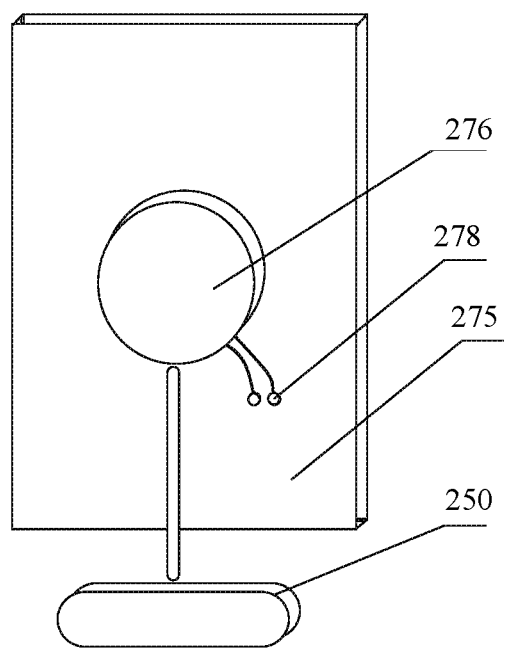
FIG. 1B is a rear view of a display apparatus according to the present application.

In some embodiments, as shown in FIG. 1B, the display apparatus 200 includes a rotating assembly 276, a controller 250, a display 275, a terminal interface 278 extending from a gap in a backplane. The rotating assembly 276 is connected with the backplane, and the rotating assembly 276 may enable the display 275 to rotate. From the angle of front watching of the display apparatus, the rotating assembly 276 may rotate a display screen to a portrait state, that is, a state where a vertical side length of the screen is greater than a horizontal side length, and may also rotate the screen to a landscape state, that is, a state where the horizontal side length of the screen is greater than the vertical side length of the screen. In some other embodiments, the controller 250 may be disposed in a rear shell of the display, and the rotating assembly may drive the controller to rotate together in a rotating process. Certainly, there may also be other disposing modes, and the specific position of the controller is not specifically limited by the present application.

Figure 2:
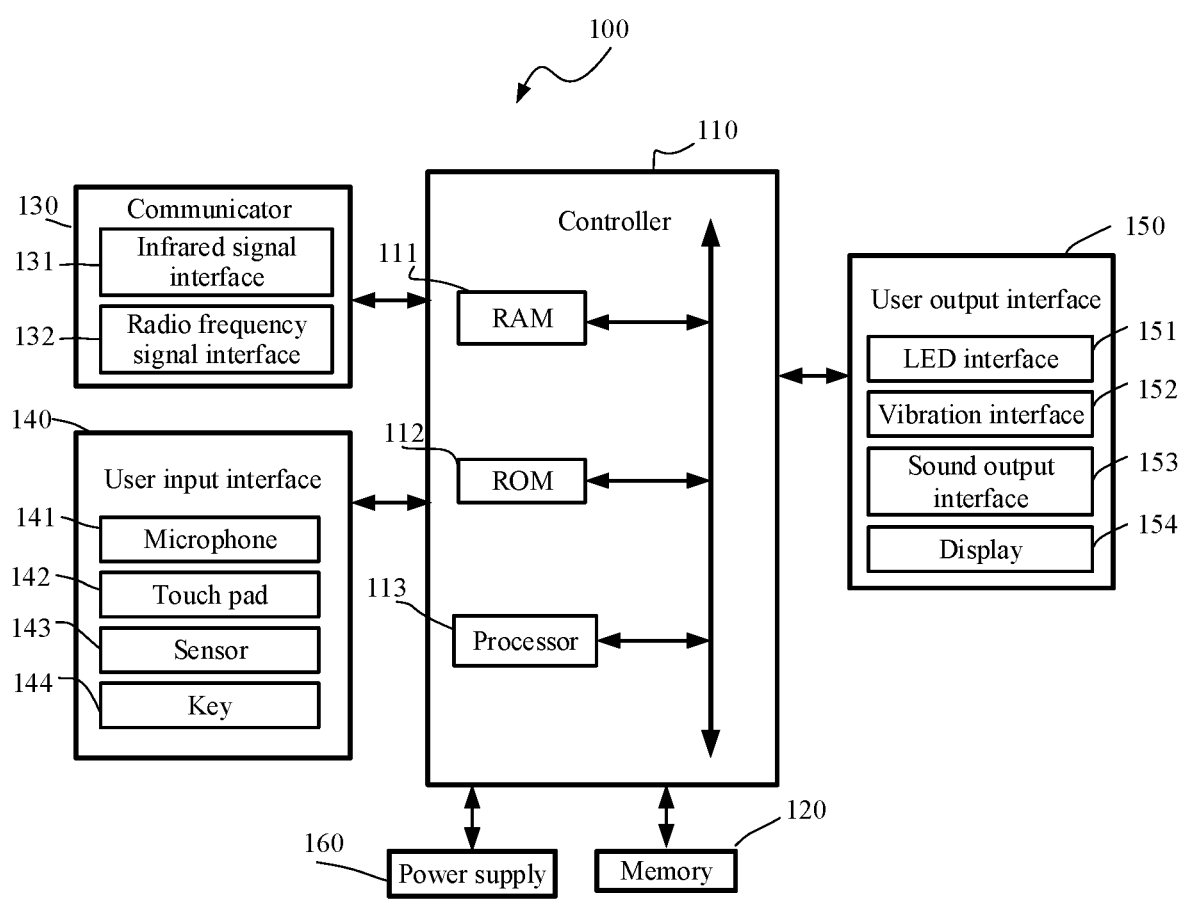
FIG. 2 is a block diagram of hardware configuration of a control device according to the present application.

FIG. 2 illustrates a configuration block diagram of a control device 100. As shown in FIG. 2, the control device 100 includes a controller 110, a memory 120, a communicator 130, a user input interface 140, a user output interface 150, and a power supply 160. Specific configuration introduction related to the control device 100 refers to a priority document of the Chinese patent application No. 202010177817.1 filed on Mar. 13, 2020.

Figure 3:
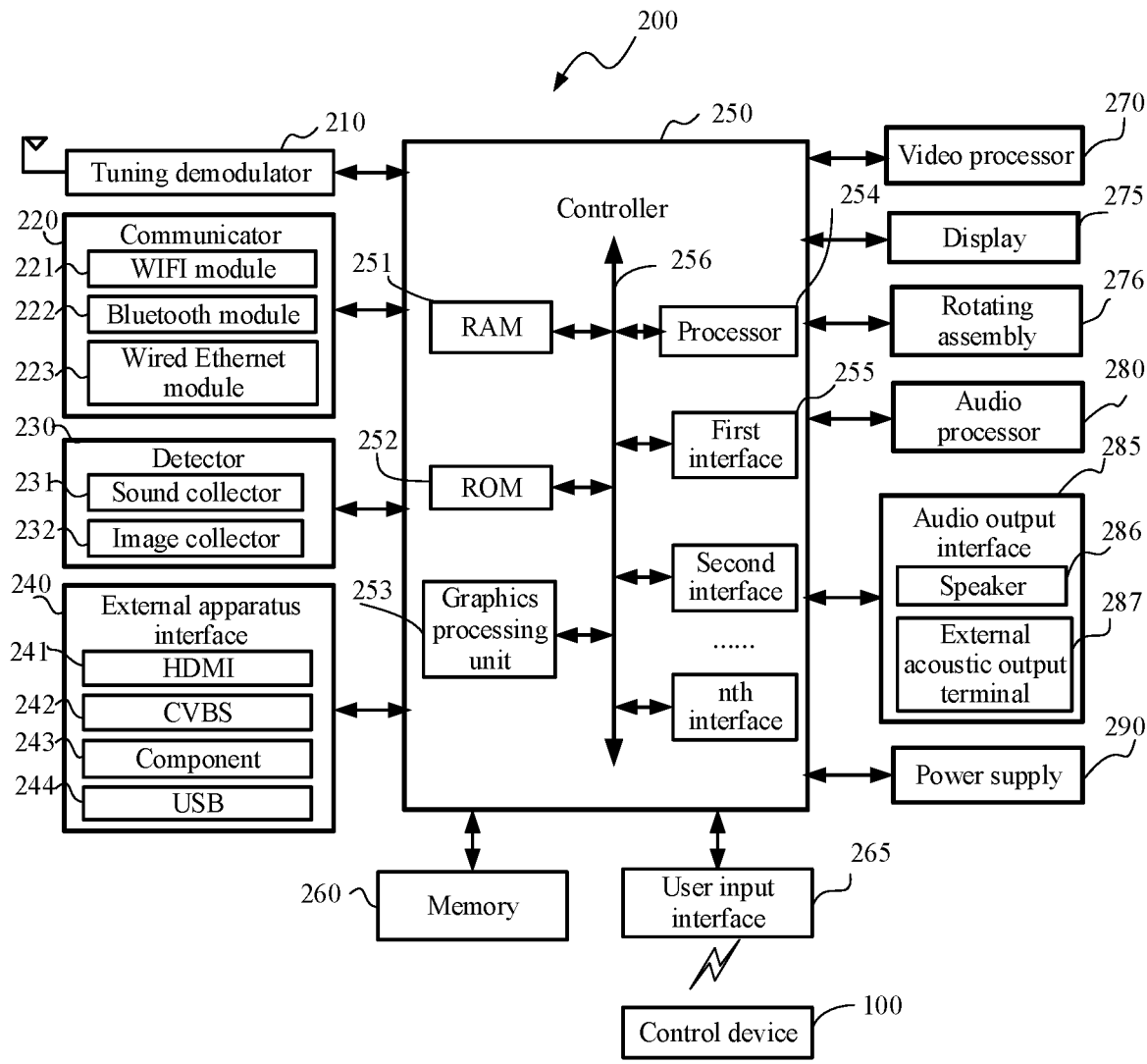
FIG. 3 is a block diagram of hardware configuration of a display apparatus according to the present application.

FIG. 3 illustrates a block diagram of hardware configuration of the display apparatus 200. As shown in FIG. 3, the display apparatus 200 may include a tuning demodulator 210, a communicator 220, a detector 230, an external device interface 240, a controller 250, a memory 260, a user input interface 265, a video processor 270, a display 275, a rotating assembly 276, an audio processor 280, an audio output interface 285, and a power supply 290.

The rotating assembly 276 may include a driving motor, a rotating shaft and other components. The driving motor may be connected with the controller 250, and outputs a rotation angle under control of the controller 250. One end of the rotating shaft is connected with a power output shaft of the driving motor, and other end of the rotating shaft is connected with the display 275, so that the display 275 may be fixedly installed on a wall or a bracket through the rotating assembly 276.

The rotating assembly 276 may further include other components, such as a transmission component and a detecting component. The transmission component may adjust a rotation speed and a torque output from the rotating assembly 276 through a specific transmission ratio, and may be in a gear transmission mode. The detecting component may include sensors disposed on the rotating shaft, such as an angle sensor and an attitude sensor. These sensors may detect parameters such as a rotation angle of the rotating assembly 276, and send the detected parameters to the controller 250, so that the controller 250 can determine or adjust a state of the display apparatus 200 according to the detected parameters. In actual application, the rotating assembly 276 may include but is not limited to one or more of the above components.

Figure 4:
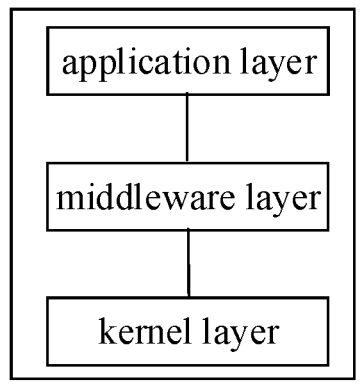
FIG. 4 is a block diagram of architecture configuration of an operating system in a memory of a display apparatus according to the present application.

FIG. 4 illustrates a block diagram of architecture configuration of an operating system in a memory of the display apparatus 200. The architecture of the operating system includes an application layer, a frame layer, a middleware layer and a kernel layer from top to bottom.

Specific configuration description related to the operation system of the display apparatus 200 may refer to a priority document of the Chinese patent application No. 202010177817.1 filed on Mar. 13, 2020.

The display apparatus 200 according to the present application includes a display 275 and a rotating assembly 276, and the rotating assembly 276 may drive the display 275 to rotate, so that the display 275 is in the different display directions. Therefore, the display directions may include a landscape display direction and a portrait display direction. The landscape display direction refers to a display direction that when watching from a front side of the display 275, a length (width) of the display 275 in a horizontal direction is greater than a length (height) in a vertical direction. The portrait display direction refers to a display direction that when watching from the front side of the display 275, the length (width) of the display 275 in the horizontal direction is smaller than the length (height) in the vertical direction.

Figure 5A:
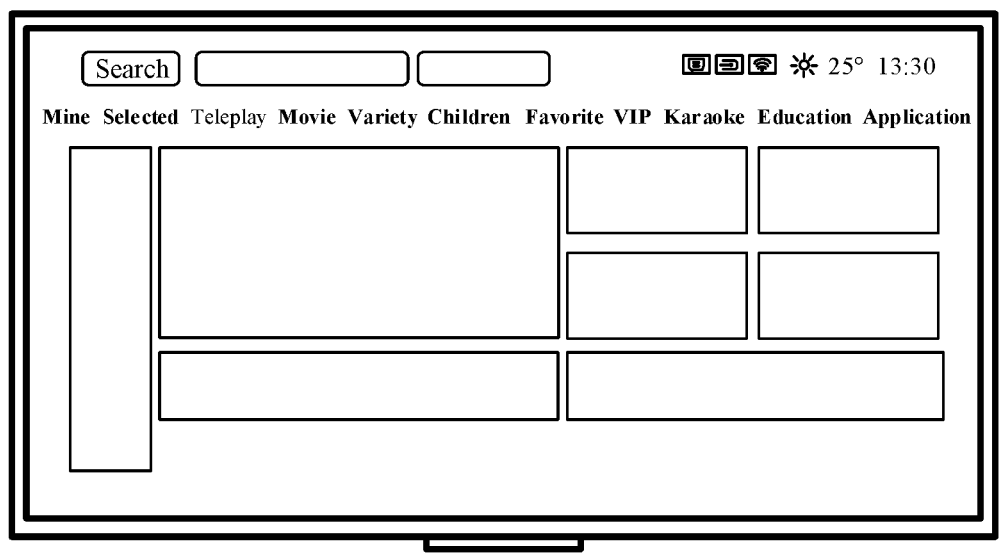
FIG. 5A is a schematic diagram of media resources in a landscape display direction according to the present application.

Obviously, considering an installation/placing position of the display apparatus 200, the vertical direction in the present application refers to be roughly vertical, and the horizontal direction also refers to be roughly horizontal. The landscape display direction is mainly configured to display landscape media resources such as a teleplay and a movie, as shown in FIG. 5A. An operating mode where the display 275 is in the landscape display direction may be called a landscape media resource view mode, and an operating mode where the display 275 is in the portrait display direction may be called as a portrait media resource view mode. The controller 250 in the display apparatus 200 is further in communication connection with the server 300, for calling an interface of the server 300 and obtaining the corresponding data. The display 275 in the display apparatus 200 can be driven to rotate by the rotating assembly 276, and is configured to display a user interface. In actual application, the user may control a playing mode, a playing content and the like of the display apparatus 200 through the control device 100. The playing mode includes the landscape media resource view mode and the portrait media resource view mode.

Figure 5B:
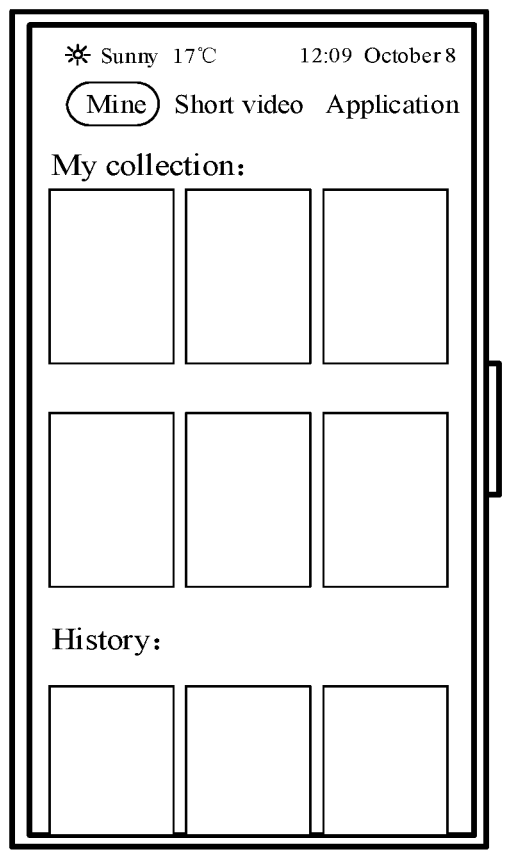
FIG. 5B is a schematic diagram of media resources in a portrait display direction according to the present application.

The portrait display direction is mainly configured to display portrait media resources such as a short video and a cartoon, as shown in FIG. 5B. Under the portrait display direction, the display 275 may display the user interface corresponding to the portrait display direction, and have an interface layout and an interaction mode corresponding to the portrait display direction. Under the portrait media resource view mode, the user may watch the portrait media resources such as the short video and the cartoon. In a similar way, because the controller 250 in the display apparatus 200 is further in communication connection with the server 300, media resource data corresponding to the portrait may be obtained by calling an interface of the server 300 during the portrait display direction.

The portrait display direction is more suitable for media resources in a portrait form with the picture proportion being 9:16, for example, the short video shot through terminals such as the mobile phone. Because terminal devices such as the mobile phone mostly adopt vertical screen proportions such as 9:16 and 9:18, when the terminal connects to the display apparatus 200 and displays a terminal picture through the display apparatus 200, the portrait display direction may avoid scaling of the picture from the terminal and fully utilizes an application page of the display 275, so as to have a better user experience.

It should be noted that the above landscape display direction and portrait display direction are only the two different display directions of the display 275, and do not limit the displayed content. For example, the vertical media resources such as the short video and the cartoon may still be displayed under the landscape display direction, the horizontal media resources such as the teleplay and the movie may still be displayed under the portrait display direction as well, and only inconsistent display windows need to be scaled and adjusted under this display direction.

When using the display apparatus 200, the user will adjust the display direction of the display 275 according to the viewing needs of the user. For example, through a key for rotation on the control device 100, or by selecting a rotation option on a UI, or issuing a rotation instruction via inputting a "rotation" related speech through a speech system, the controller 250 may control the rotating assembly 276 to rotate through the rotation instruction, to drive the display 275 to rotate. For example, when the user wants to watch the short video through the display apparatus 200, a rotation instruction may be input through one of the above modes, so that the display 275 under the landscape display direction anticlockwise rotates by 90 degrees to the portrait display direction, to adapt the picture proportion of the vertical applications such as the short video.

Because the rotatable television is in a new form, a large amount of applications in applications of the display apparatus are not subjected to adaptive modification. In the applications installed in the display apparatus, some applications only support the landscape display direction, and some applications only support the portrait display direction. In some scenarios, if the display direction of the display 275 is the portrait display direction, at this time, the user wants to start one application which only supports the landscape display direction through a remote control or voice command. If the application is directly started according to an application starting logic of a traditional television in this case, resulting in mismatch between the display direction of the display 275 with an application display direction poor user experience.

Figure 6:
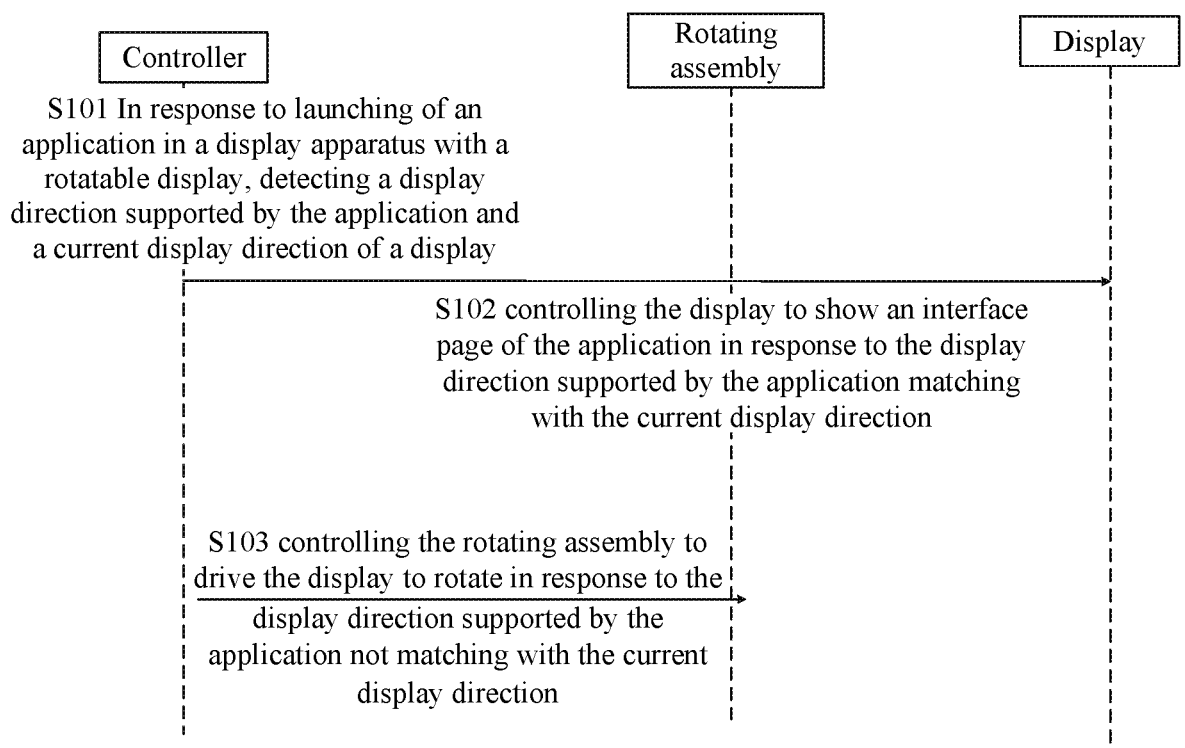
FIG. 6 is a flow chart of a display apparatus according to an embodiment of the present application.

Some embodiments of the present application provide a display apparatus, and specific operation processes may refer to FIG. 6. A structure of the display apparatus and functions of all parts may refer to the above embodiments.

On the basis of the above embodiments, the controller 250 is configured to perform the following operations.

S101, in response to launching of an application in a display apparatus with a rotatable display, detecting a display direction supported by the application and a current display direction of a display 275.

A launching process of the application roughly includes the following operations: a transition service which is responsible for starting an application, upon receiving a request for starting an application, if the request has intent information for specific starting, the transition service obtains a landscape and portrait that the intent information supports through a framework Package Manager, if the request has no intent information for specific starting, the transition service obtains main entry intent of the application through Package Manager firstly, and then determines a landscape and portrait that the main entry intent of the application supports. An animation for rotation is displayed after determination, and application Intent is started, wherein the Intent is an object in Android system, including Action element and Data element.

In a process of pulling or launching the application, the controller 250 may obtain that a display direction supported by the application is a landscape display direction or a portrait display direction by running a relevant application. There are many ways to determine the display direction supported by a current application.

For example, the controller 250 may obtain configuration information of the application through the framework Package Manager, and then determine that the display direction supported by the current application is the landscape display direction or the portrait display direction based on the configuration information. Taking Android system as an example, an application interface of a type of Activity configures a value for each attribute (namely, configuration information) in a register list file Android Manifests.xml, wherein configuration attribute of "android: screen orientation" is configured to indicate a display direction of a screen supported by the application interface. Generally, a default value of the screen orientation configuration attribute is unspecified, which means that the display direction is selected by the system. The direction is determined by a device. For example, the display apparatus is generally placed horizontally, and the display direction of the display apparatus is the landscape display direction when the screen orientation configuration attribute is not specified. The screen orientation configuration attribute may be specified as: Landscape, which means landscape display as a mandatory option; Portrait which means portrait display as a mandatory option; and Behind which means same as the previous application interface. In an embodiment, the screen orientation attribute value registered in the application is set as: android: screen orientation="landscape". In an embodiment, the controller 250 determines that the display direction supported by the application is the landscape display direction accordingly. For another example, the screen orientation attribute registered in the application is: android: screen orientation="portrait", and the controller 250 determines that the display direction supported by the application is the landscape display direction.

For another example, a direction identifier may be added in the configuration information. The controller 250 determines the display direction supported by the application interface of a current application corresponding to the configuration information by recognizing the direction identifier. The controller 250 is further configured to: read the direction identifier; if a displayed direction identifier is a first direction identifier, the display direction supported by the application is the landscape display direction; and if the displayed direction identifier is a second direction identifier, the display direction supported by the application is the portrait display direction. The value of the first identifier value and the value of the second identifier value may be set according to needs. An identifier value may be added in the configuration information: com.android.APP, H/V/HV, wherein H indicates only supporting the landscape display direction, V indicates only supporting portrait, and HV indicates supporting both the landscape display direction and portrait display direction. In an embodiment, the controller 250 calls the direction identifier of the application: com.android. APP, H, and thus the controller 250 determines that the display direction supported by the application is the landscape display direction. In another embodiment, the controller 250 reads the direction identifier of the application: com.android.APP, V, and thus the controller 250 determines that the display direction supported by the application is the portrait display direction.

While detecting the display direction supported by the application, the controller 250 is further configured to obtain a current display direction of the display 275. The current display direction of the display 275 may be detected through a built-in sensor of the display apparatus 200. For example, a gyroscope, a gravity acceleration sensor and the like are disposed in the display 275 of the display apparatus 200, and posture data of the display 275 relative to a gravity direction may be determined by measuring an angle acceleration or the gravity direction. The posture data detected are compared with posture data under the landscape display direction and the portrait display direction respectively, so as to determine a current display direction of the display 275.

For another example, a grating angle sensor, a magnetic field angle sensor or a sliding resistor angle sensor are disposed in the rotating assembly 276. The rotated angle of the rotating assembly 276 is measured, and compared with angles under the landscape display direction and the portrait display direction respectively, so as to determine the current display direction of the display 275.

S102, controlling the display 275 to show an interface page of the application in response to the display direction supported by the application matching with the current display direction.

S103, controlling the rotating assembly 276 to drive the display 275 to rotate in response to the display direction supported by the application not matching with the current display direction to cause the display direction of the display 275 to match with the display direction supported by the application.

In a display adapting process, if the display direction of the application is consistent with or matches with the current display direction of the display 275, an interface page of the application may be directly displayed. If the display direction supported by the application is inconsistent with or does not match with the current display direction, the display 275 is rotated, to make the display direction of the display 275 after rotation match with the display direction supported by the application.

For example, it is detected that a current rotation angle of the display 275 is 90 degrees through the angle sensor, and thus it may be determined that the display direction of the display 275 is the portrait display direction. When it is determined that the display direction supported by a current application is the landscape display direction, it is determined that the display direction of the display 275 is inconsistent with the display direction supported by the application, the display 275 may be rotated to make the display direction of the rotated display 275 match with the display direction of the application.

For another example, it is detected that the current rotation angle of the display 275 is 0 degree through the angle sensor, and thus it may be determined that the display direction of the display 275 is the landscape display direction. While when it is determined that the display direction supported by a current application is the landscape display direction, it is determined that the display direction of the display 275 is consistent with the display direction supported by the application, and the display 275 is controlled to display an interface page of the application.

Figure 7:
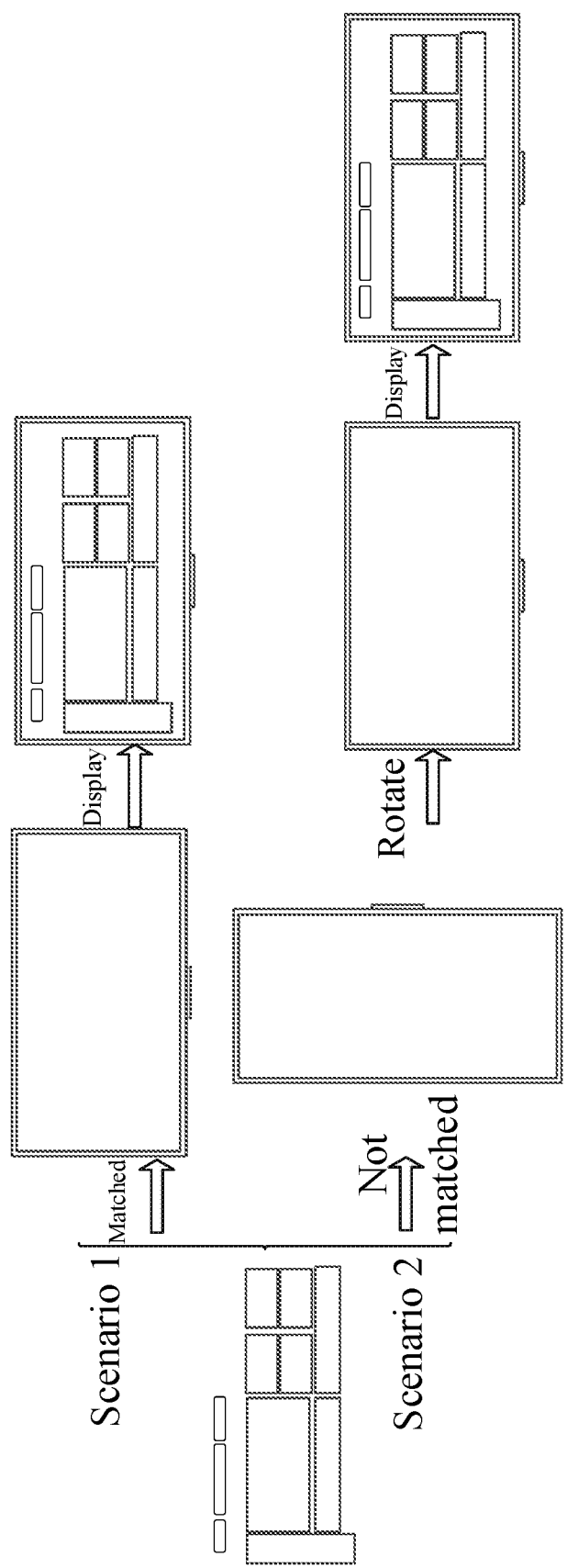
FIG. 7 is a scenario diagram of a display apparatus according to the present application.

The operation process of the display apparatus is described below in detail with reference to the specific examples. FIG. 7 is a scenario diagram of the display apparatus according to an embodiment of the present application.

In scenario 1, the controller 250 determines that the display direction of the application is the landscape display direction by reading the configuration information of the application. The controller 250 detects that the current display direction of the display 275 is the landscape display direction. The controller 250 determines that the display direction supported by the current application is consistent with the display direction of the display 275. The controller 250 controls the display 275 to display an interface page (for example, as shown in FIG. 5A) of the current application.

In scenario 2, the controller 250 determines that the display direction of the application is the landscape display direction by reading the configuration information of the application. The controller 250 detects that the current display direction of the display 275 is the portrait display direction. The controller 250 determines that the display direction supported by the current application is inconsistent with the current display direction of the display 275. The controller 250 controls the rotating assembly 276 to drive the display 275 to rotate, to cause the display direction of the display 275 after rotation to the landscape display direction. The controller 250 controls the display 275 to display an interface page (for example, as shown in FIG. 5A) of the current application.

In order to improve user experience, a rotation animation is usually played in the rotating process of the display apparatus, so as to improve user's view experience.

The rotation animation presented on the display 275 may be a predefined transition picture built in the operating system, and may also be a third-party video resource displayed on the display apparatus 200 for commercial purposes. For example, the rotation animation may be video recommended resources such as a trailer pushed from a server according to user preferences, or an advertisement video resource.

A rotation animation resource file may be stored in a memory 260 of the display apparatus 200. When the controller 250 controls the display apparatus to rotate, the rotation animation resource file is directly called from the memory 260 of the display apparatus 200. The rotation animation resource file may further be obtained from a server 300 in real time, so as to reduce storing space of the memory 260.

Figure 8:
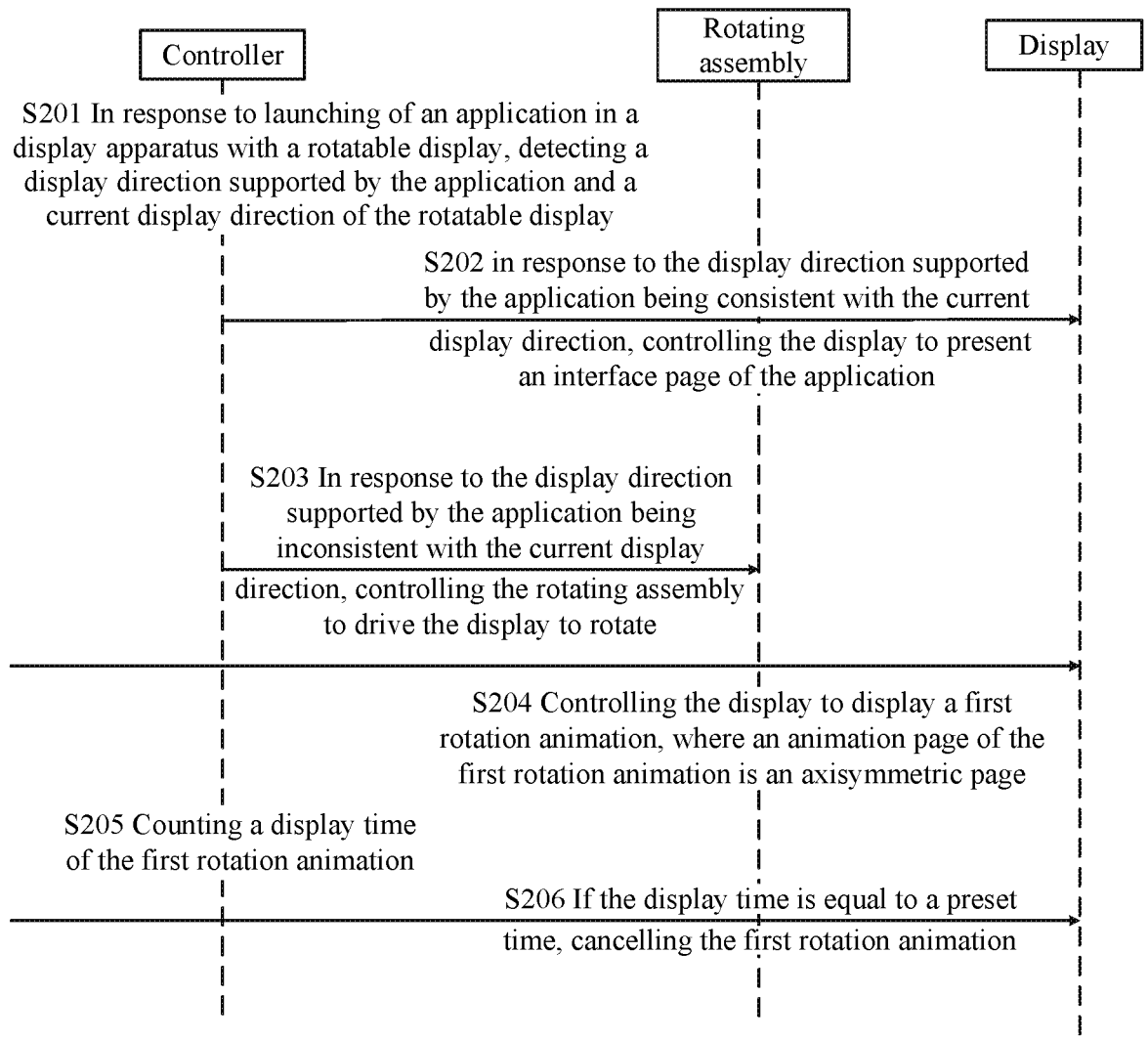
FIG. 8 is a flow chart of a display apparatus according to an embodiment of the present application.

The present application provides a display apparatus 200, and a method flow for the display apparatus is as shown in FIG. 8. A controller 250 is configured to perform S201: in response to launching of an application in a display apparatus with a rotatable display, detecting a display direction supported by the application and a current display direction of the rotatable display 275.

How to determine the display direction supported by the application and the current display direction of the display 275 may refer to the above embodiments.

S202, in response to the display direction supported by the application being consistent with the current display direction, controlling the display 275 to present an interface page of the application.

S203, in response to the display direction supported by the application being inconsistent with the current display direction, controlling the rotating assembly 276 to drive the display 275 to rotate to cause the display direction of the rotated display 275 to match with the display direction supported by the application.

S204, controlling the display 275 to display a first rotation animation, where an animation page of the first rotation animation is an axisymmetric page.

In the present embodiments, if the display direction supported by the current application is inconsistent with the current display direction, the rotating assembly 276 is controlled to drive the display 275 to rotate to cause the display direction of the display 275 rotated to match with the display direction supported by the application. A first rotation animation resource is called in the process that the controller 250 controls the display 275 to rotate. The controller 250 draws the animation resource into the first rotation animation on the display. The controller 250 controls the display 275 to present the first rotation animation. In the rotating process of the display 275, the display apparatus shown by the embodiment of the present application controls the display 275 to present the first rotation animation, so as to improve view experience of the user.

Figure 9:
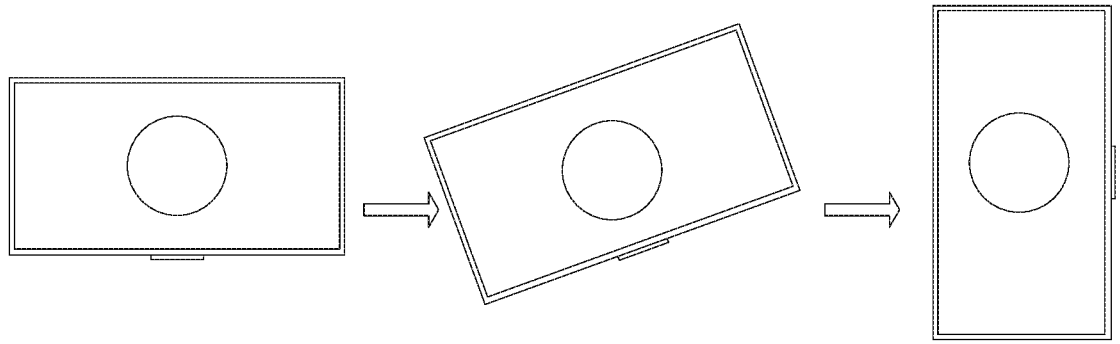
FIG. 9 is a schematic diagram of an animation page corresponding to a second rotation animation in a rotating process of a display.

A schematic diagram of an animation page may refer to FIG. 9 in the rotating process of the display 275. It can be seen that the animation page of the first rotation animation is a center axisymmetric page, and thus the first rotation animation does not influence user's view in the rotating process.

In some embodiments, when the display 275 rotates to a standard display direction, the first rotation animation needs to be cancelled. The standard display direction is a relative value, and the specific standard display direction is to rotate by 90 degrees relative to a current state of the display apparatus. For example, the current display direction of the display 275 is the landscape display direction, and the corresponding standard display direction is the portrait display direction. For another example, the current display direction of the display 275 is the portrait display direction, and the corresponding standard display direction is the landscape display direction.

There are many implementations for cancelling the first rotation animation. For example, the controller 250 cancels the first rotation animation by performing the following operations: counting a display time of the first rotation animation (S205); and if the display time is equal to a preset time, cancelling the first rotation animation (S206). In the embodiments of the present application, the controller 250 counts the display time of the first rotation animation in real time, wherein the display time may be determined according to a rotation speed of the display 275. For example, the display 275 needs 10 s to rotate by 90 degrees, and thus the preset time may be set to be 10 s. When the display time is greater than the preset time, the controller 250 cancels the first rotation animation.

For another example, the controller 250 may determine the time of cancelling the first rotation animation by detecting a rotation rate of the rotating assembly 276 in real time. Specifically, the controller 250 may be configured to: calculate a change rate of a rotation angle of the assembly; and cancel the first rotation animation if the change rate is smaller than a preset change rate.

For another example, the controller 250 may determine the time of cancel the first rotation animation by detecting a rotation angle of the rotating assembly 276 in real time. Specifically, the controller 250 may be configured to: obtain the rotation angle of the rotating assembly 276; and cancel the first rotation animation if the rotation angle is 90 degrees.

Figure 10:
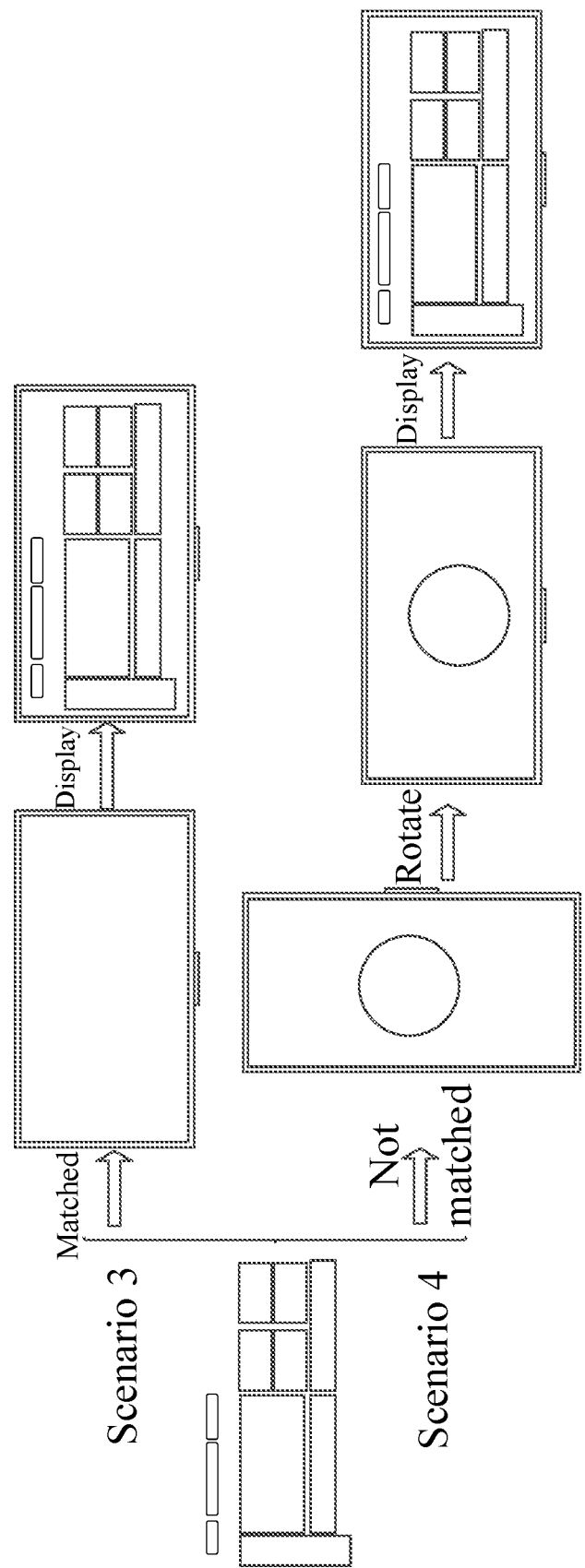
FIG. 10 is an application scenario diagram of a display apparatus according to an embodiment of the present application.

The operation process of the display apparatus is described below in detail with reference to the specific examples. FIG. 10 is a scenario diagram of the display apparatus according to some embodiments of the present application.

In scenario 3, the controller 250 determines that the display direction of the application is the landscape display direction by reading the configuration information of the application. The controller 250 detects that the current display direction of the display 275 is the landscape display direction. The controller 250 determines that the display direction supported by the current application is consistent with the current display direction of the display 275. The controller 250 controls the display 275 to display an interface page (for example, as shown in FIG. 5A) of the current application.

In scenario 4, the controller 250 determines that the display direction of the application is the landscape display direction by reading the configuration information of the application. The controller 250 detects that the current display direction of the display 275 is the portrait display direction. The controller 250 determines that the display direction supported by the current application is inconsistent with the current display direction of the display 275. The controller 250 controls the rotating assembly 276 to drive the display 275 to rotate to cause the display direction of the rotated display 275 to the landscape display direction. The first rotation animation resource is called in the process that the controller 250 controls the display 275 to rotate. The controller 250 draws the first animation resource called from the memory into the first rotation animation. The controller 250 controls the display 275 to present the first rotation animation (for example, as shown in FIG. 5A). In the rotating process of the display 275, the display apparatus controls the display 275 to present the rotation animation, so as to improve the view experience of the user.

In the above embodiments, a schematic diagram of an animation page in the rotating process of the display 275 may refer to FIG. 9. It can be seen from FIG. 9 that the animation page of the first rotation animation is a center axisymmetric page, and thus the rotation animation does not influence the user's view in the rotating process.

Figure 11:
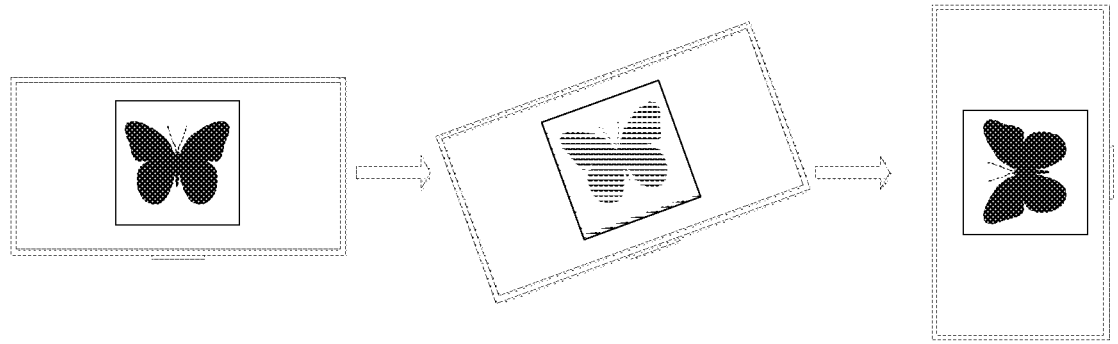
FIG. 11 is a schematic diagram of an animation page corresponding to a second rotation animation in a rotating process of a display.

In another embodiment of the display apparatus, a rotation animation configured by the display apparatus is a noncentral axisymmetric page (may also be called a second rotation animation in the present embodiments). The rotation animation of the noncentral axisymmetric page rotates together with the display 275 in the rotating process of the display 275. FIG. 11 is a schematic diagram of an animation page corresponding to a second rotation animation in the rotating process of the display 275. It can be seen that in the rotating process of the display 275, the animation page rotates as well, and consequently, the animation page watched by the user tilts.

Figure 12:
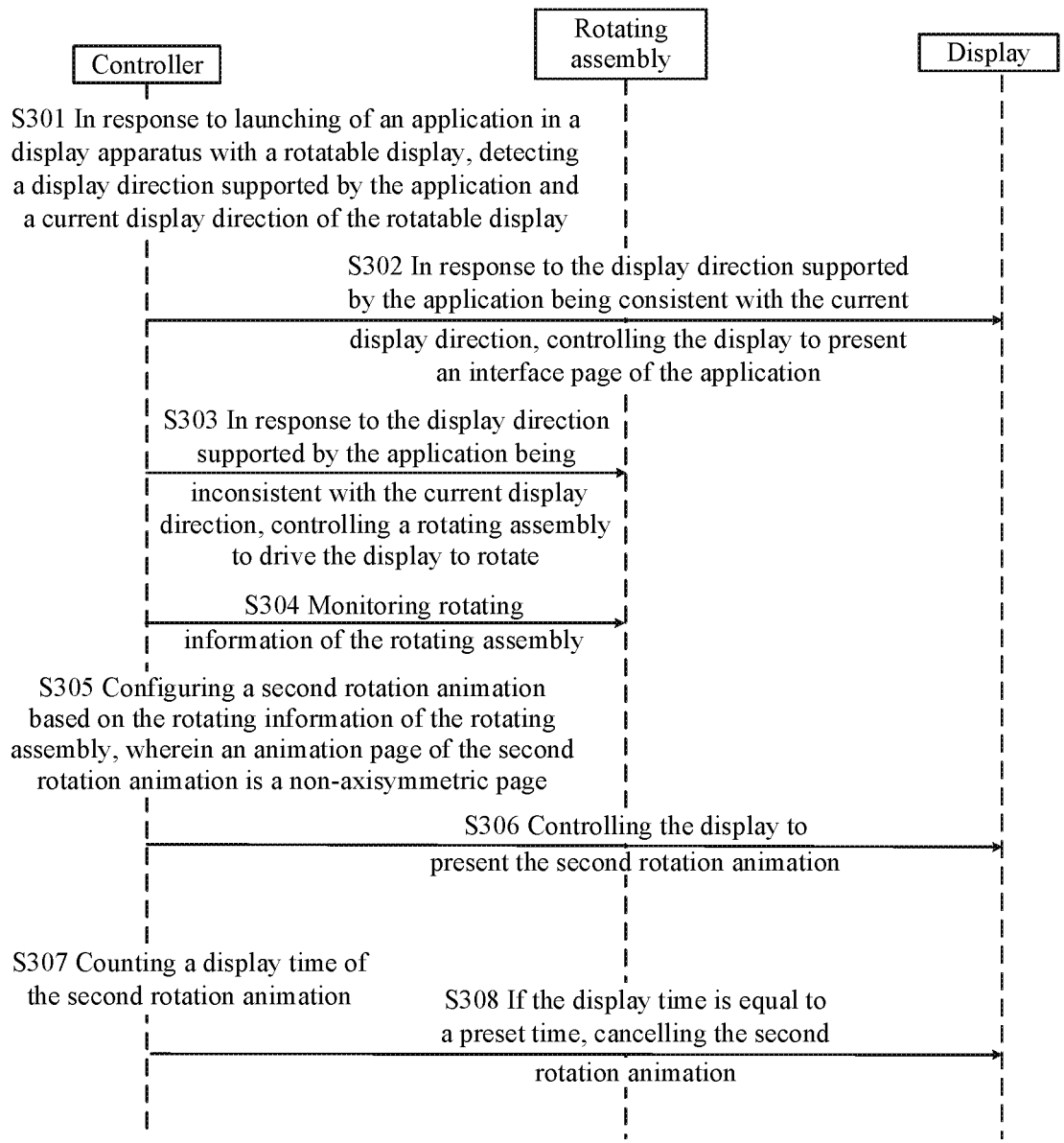
FIG. 12 is a flow chart of a display apparatus according to an embodiment of the present application.

The present application provides a display apparatus 200, and a flow of the display apparatus may refer to FIG. 12. A controller 250 of the display apparatus is configured to perform S301: in response to launching of an application in a display apparatus with a rotatable display, detecting a display direction supported by the application and a current display direction of the rotatable display 275.

S302, in response to the display direction supported by the application being consistent with the current display direction, controlling the display 275 to present an interface page of the application.

S303, in response to the display direction supported by the application being inconsistent with the current display direction, controlling a rotating assembly 276 to drive the display 275 to rotate to cause the display direction of the rotatable display 275 to be consistent with the display direction supported by the application.

S304, monitoring rotating information of the rotating assembly 276.

The present application may detect the rotating information of the rotating assembly through the angle sensor, and may also detect the rotating information through an angle accelerator.

S305, configuring a second rotation animation based on the rotating information of the rotating assembly, wherein an animation page of the second rotation animation is a non-axisymmetric page.

In some embodiments, the controller 250 controls the rotating assembly 276 to drive the display 275 to start rotating, and monitors the rotating information of the rotating assembly in real time. At 0.2 s, the rotating information of the rotating assembly monitored by the controller 250 is "moving right by 2 degrees". The controller 250 converts a rotation angle (2 degrees) of the assembly into an animation user angle (−2 degrees), and the animation user angle is a negative number of the assembly rotation angle. The controller 250 configures rotation animation interface initialization OpenGL, configures an OpenGL environment, loads an animation resource, and sets one or more animation parameters. An animation content starts to be configured, an angle of all animation models is to rotate right by −2 degrees. In a subsequent configuration process, the angle will change with the assembly rotating information, to ensure that the second rotation animation always rotates with a center of the display 275 during rotating. For example, a size of the display 275 is W*H, the corresponding rotation animation rotates with a point (W/2, H/2).

In an embodiment, the controller 250 controls the rotating assembly 276 to drive the display 275 to start rotating, and monitors the assembly rotating information in real time. At 0.2 s, the assembly rotating information monitored by the controller 250 is "moving right by 2 degrees". The controller 250 converts an assembly rotating direction (rightwards rotating) into an animation rotating direction (leftwards rotating). The controller 250 configures rotation animation interface initialization OpenGL, configures an OpenGL environment, loads an animation resource, and sets one or more animation parameters. An animation content starts to be configured, an angle of all animation models is to leftward rotate by 2 degrees. In a subsequent configuration process, the angle will change with the assembly rotating information, so as to ensure that the second rotation animation always rotates with a center of the display 275 during rotating. The animation always rotates with the center of the display 275 during rotating. For example, a size of the display 275 is W*H, the corresponding rotation animation rotates with a point (W/2, H/2).

Figure 13:
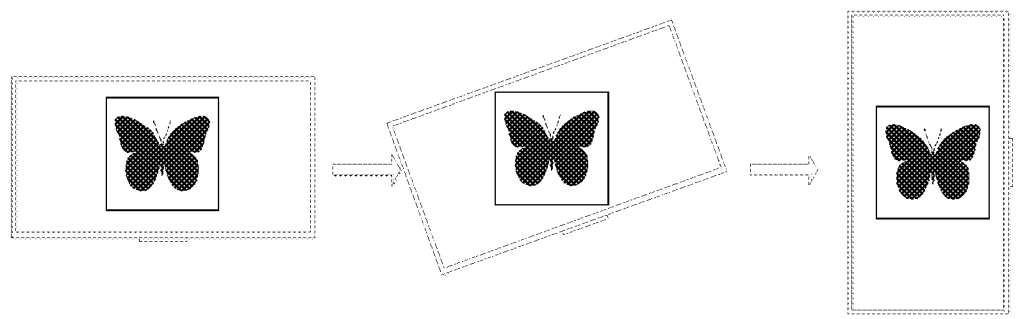
FIG. 13 is an exemplary schematic diagram of an application page corresponding to a second rotation animation in a rotating process of a display.

A configuration mode of the rotation animation shown by the above embodiments can ensure that the second rotation animation always rotates with the center of the display 275 during rotating. A schematic diagram of the animation page in the rotating process of the display 275 may refer to FIG. 13. It may be seen from FIG. 13 that in the rotating process of the display 275, the animation page always remains still, that is, a display view angle of the animation page is always consistent with a view angle of the user, and the user experience is good.

S306, controlling the display 275 to present the second rotation animation.

In some embodiments, when the display 275 rotates to a standard display direction, the rotation animation needs to be cancelled or disappear from the display. The standard display direction is a relative value, and the specific standard display direction is to rotate by 90 degrees relative to a current state of the display apparatus.

For example, the controller 250 may determine a time for cancelling the second rotation animation by counting a display time of the second rotation animation. Specifically, the controller 250 is configured to execute the following operations: counting a display time of the second rotation animation (S307); and if the display time is equal to a preset time, cancelling the second rotation animation (S308). In the embodiment of the present application, the controller 250 counts the display time of the second rotation animation in real time, wherein the display time may be determined according to a rotation speed of the display 275. For example, the display 275 needs 10 s to rotate by 90 degrees, and thus the preset time may be set to be 10 s.

For another example, the controller 250 may determine the time of cancelling the second rotation animation by detecting a rotation rate of the rotating assembly 276 in real time. Specifically, the controller 250 may be configured to: calculate a change rate of a rotation angle of the assembly; and terminate presentation of the second rotation animation if the change rate is smaller than a preset change rate.

Figure 14:
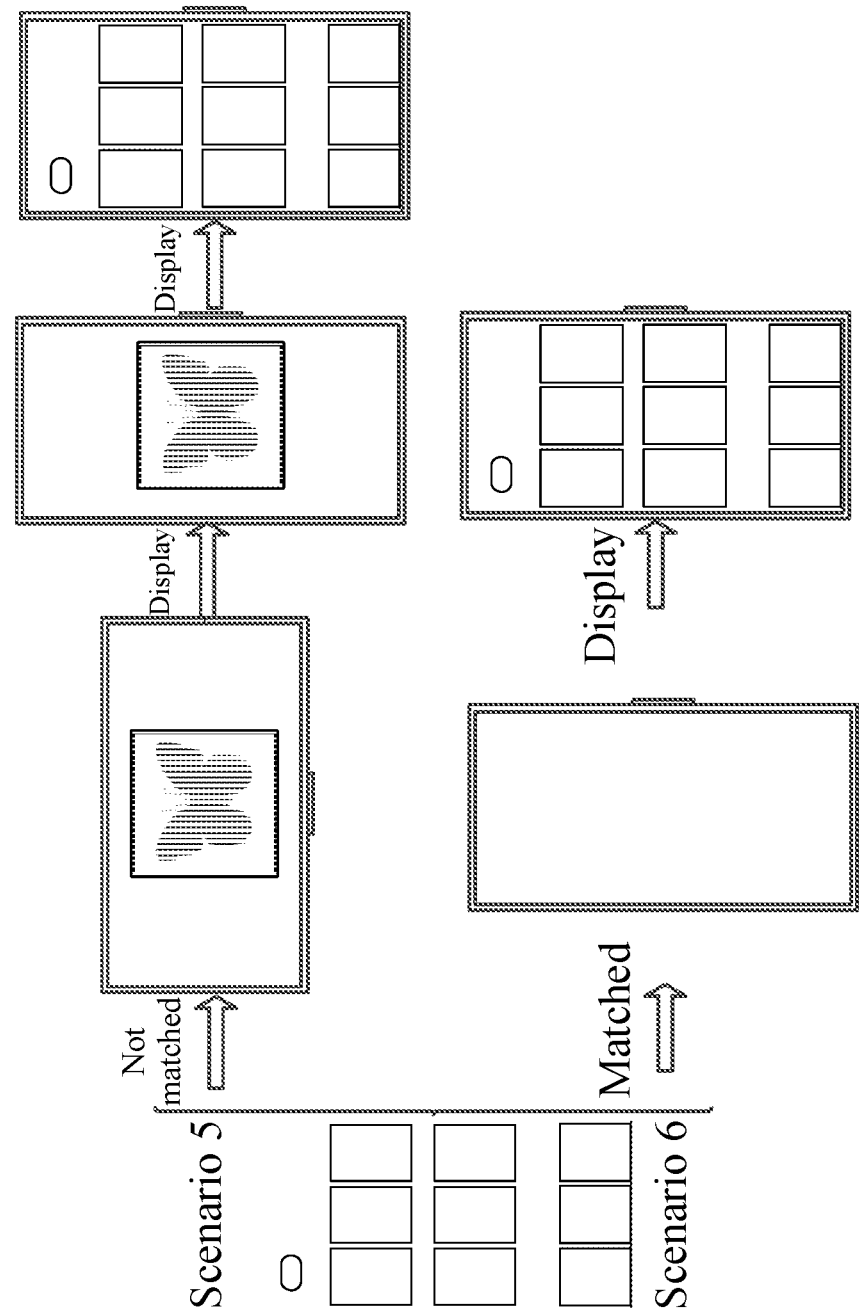
FIG. 14 is a scenario diagram of a display apparatus according to an embodiment of the present application.

The operation process of the display apparatus in the present embodiments is illustrated below in detail with reference to the specific examples. FIG. 14 is a scenario diagram of a display apparatus according to an embodiment.

In scenario 5, the controller 250 determines that the display direction of the application is the landscape display direction by reading the configuration information of the application, and then detects that the current display direction of the display 275 is the landscape display direction. The controller 250 determines that the display direction supported by the current application is consistent with the current display direction of the display 275. The controller 250 controls the display 275 to present an interface page (for example, as shown in FIG. 5B) of the current application.

In scenario 6, the controller 250 determines that the display direction of the application is the landscape display direction by reading the configuration information of the application. The controller 250 detects that the current display direction of the display 275 is the portrait display direction. The controller 250 determines that the display direction supported by the current application is inconsistent with the current display direction of the display 275. The controller 250 controls the rotating assembly 276 to drive the display 275 to rotate, so that the display direction of the rotated display 275 reach the landscape display direction. A rotation animation resource is called in the process that the controller 250 controls the display 275 to rotate, then the called animation resource is drawn into rotation animation, and finally, the display 275 is controlled to present the rotation animation (for example, as shown in FIG. 5B). In the rotating process of the display 275, the display apparatus controls the display 275 to present the rotation animation, so as to improve the user experience.

In some other embodiments of the present application, in addition to a launching process of an application, whether the display needs to be rotated is determined according to which rotation states are supported by the application. The user may rotate the display by issuing a rotation instruction through a key on the control device 100, a rotation instruction triggered on the display, a rotation gesture, a speech instruction with a rotation intent or other modes.

Because a large amount of applications may be installed in the rotatable television, some applications can only support the landscape direction, some applications only support the portrait direction, and some are compound applications.

When the user sends a rotation command to the television, a state of the display is switched. If the application at this time does not support the rotated display direction, causing poor user experience.

Figure 15:
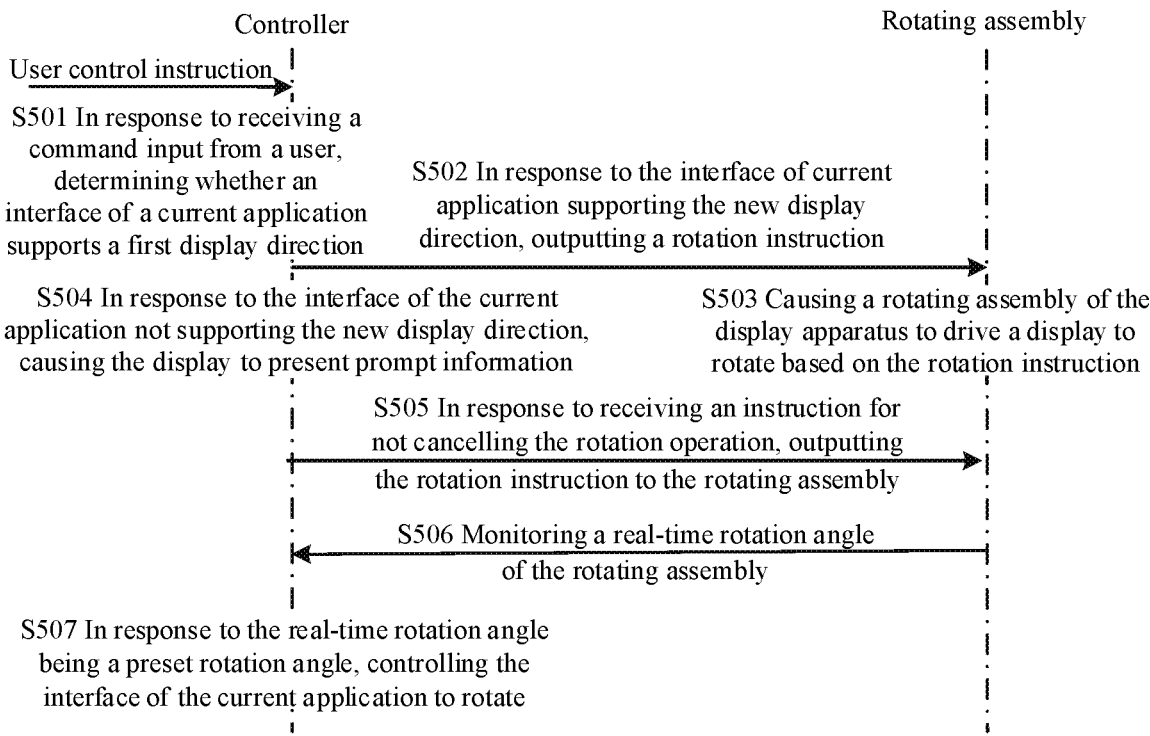
FIG. 15 is a flow chart of a display apparatus according to an embodiment of the present application.

Some embodiments of the present application provide a display apparatus, and specific operation processes may refer to FIG. 15. A structure of the display apparatus and functions of all parts may refer to the above embodiments. On the basis of the above embodiments, the controller is configured to perform S501: in response to receiving a command input from a user, determining whether an interface of a current application supports a first display direction, wherein the command is configured to trigger rotation of the display, and the first display direction is a display direction after rotating the display.

In the present embodiments, the command may be a user speech, for example, the user speech is "rotating by XX degrees towards X", "rotating towards X to a portrait mode", "rotating to the portrait mode", etc. In the present embodiments, the command may also be operation information. Specifically, the user may issue the operation information to a controller 250 through a remote control. For example, a shortcut key of the remote control corresponds to the operation information "rotating by XX degrees towards X", and the user touches the shortcut key so as to trigger the remote control to send the operation information.

In the embodiments of the present application, when the controller 250 receives a command input from the user, instead of immediately controlling the display to rotate, the controller firstly determines whether the interface of the current application supports the new display direction after rotation, and adopts different processing modes according to different results.

How the controller 250 determines whether an interface of the current application supports the new display direction discusses as follows.

Figure 16:
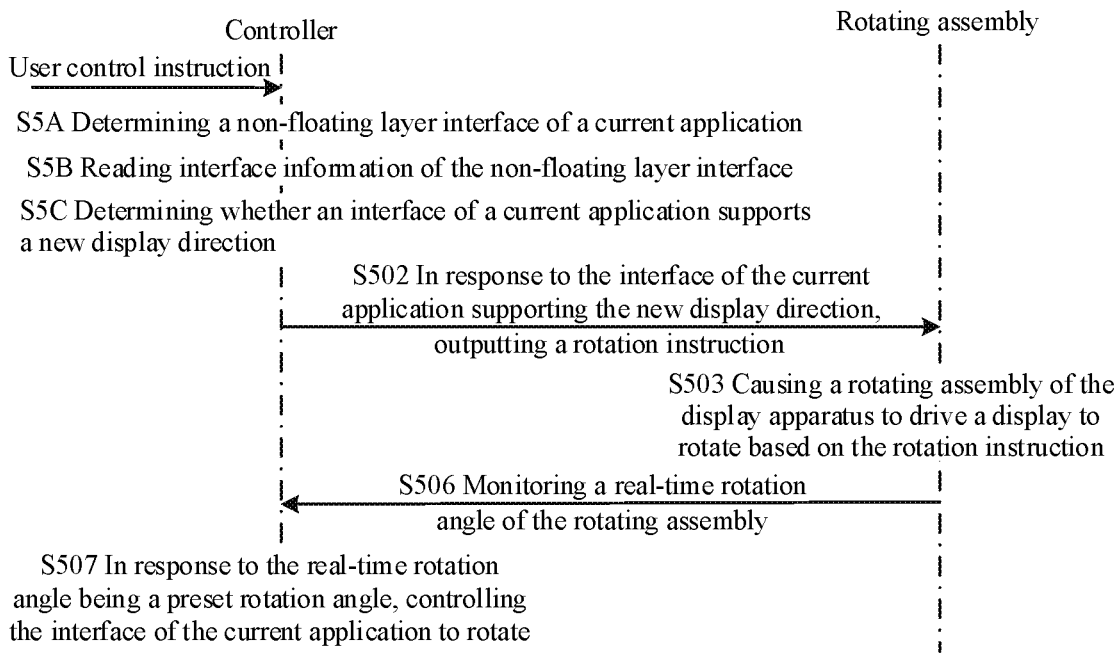
FIG. 16 is a flow chart of a display apparatus according to an embodiment of the present application.

Referring to FIG. 16, FIG. 16 is an operation flow of a display apparatus according to an embodiment. It can be seen that the controller 250 is further configured to perform the following operations.

S5A, determining a non-floating layer interface of a current application.

In the present application, an application interface includes a floating layer interface and a non-floating layer interface.

The floating layer interface refers to a temporary interface for launching an application on a current page. These temporary application interfaces can realize suggestive or context related tasks. Their interruption property is weak, and a consecutive use experience is kept for a user. The floating layer interface may also be called "floating layer", "popup", "popout", etc.

The non-floating layer interface is an interface that the application displays its characteristics and constructs functions for outside, and the non-floating layer interface usually occupies the overall display interface in a display process. Therefore, the non-floating layer interface directly influences the experience of the user in terms of display effect. According to the embodiment of the present application, the non-floating layer interface of the current application is determined firstly before controlling the display to rotate.

Figure 17:
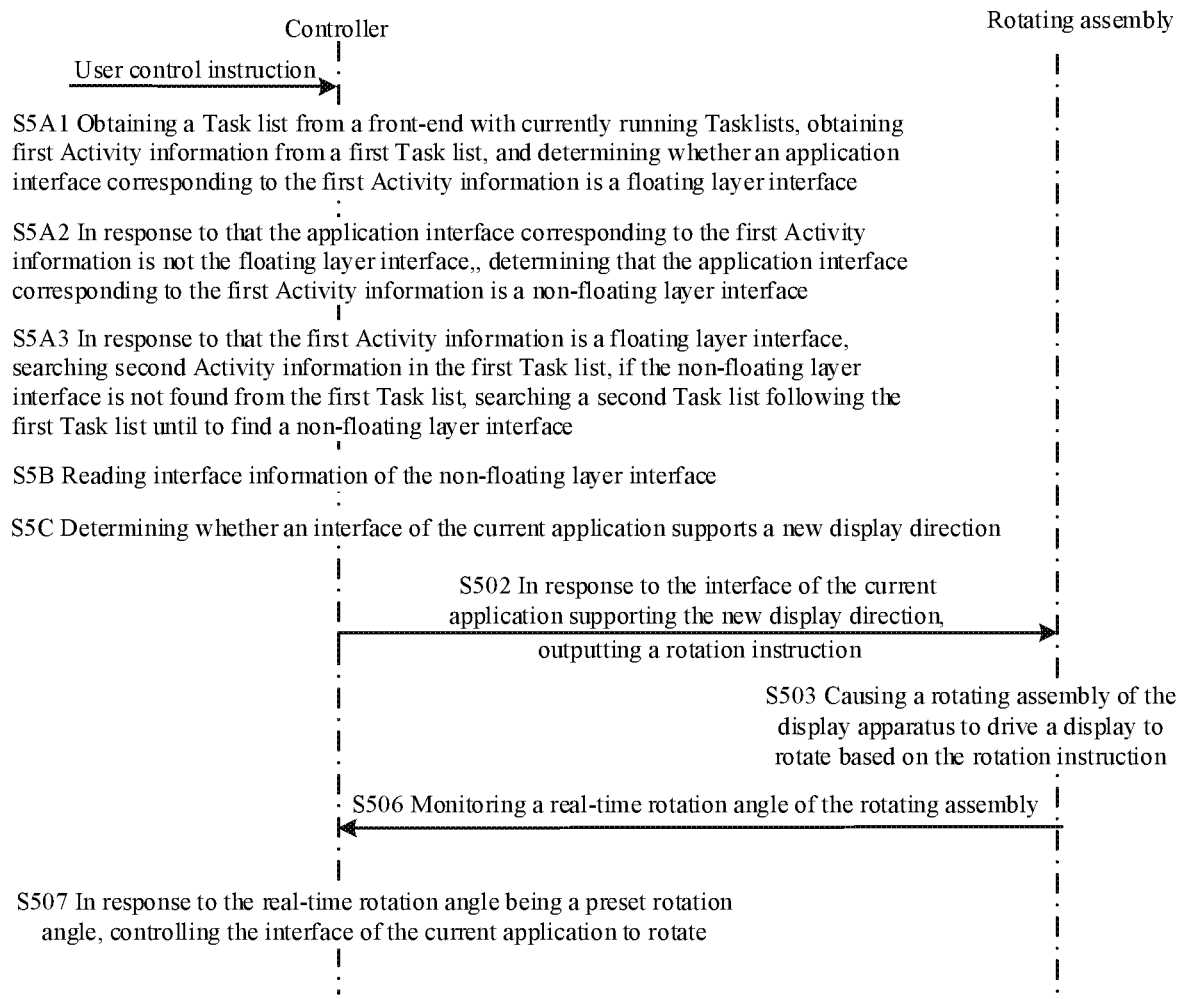
FIG. 17 is a flow chart of a display apparatus according to an embodiment of the present application.

The non-floating layer interface may be determined through the following method. The specific process may refer to FIG. 17. FIG. 17 is an operation flow chart of the display apparatus according to an embodiment. It can be seen that the controller 250 is further configured to perform the following operations.

S5A1, obtaining a Task list from a front-end with currently running Tasklists, obtaining first Activity information from a first Task list, and determining whether an application interface corresponding to the first Activity information is a floating layer interface.

Obtaining a Task list running at the front-end may be to input a Tasklist command in a port of a system, so that all processes of a local machine may be displayed in the list of tasks. The Tasklist command may not only view a system process, but also view Activity information of each process. The first Activity information is information about the first Activity. Whether the application interface of this process is a non-floating layer interface may be determined by recognizing the Activity information of the application interface of this process.

There may be various ways for determining whether the application interface of this process is the non-floating layer interface through the Activity information.

For example, whether the application interface corresponding to the Activity information is the non-floating layer interface may be determined through whether the Activity information is stored in a floating layer interface list.

Figure 18:
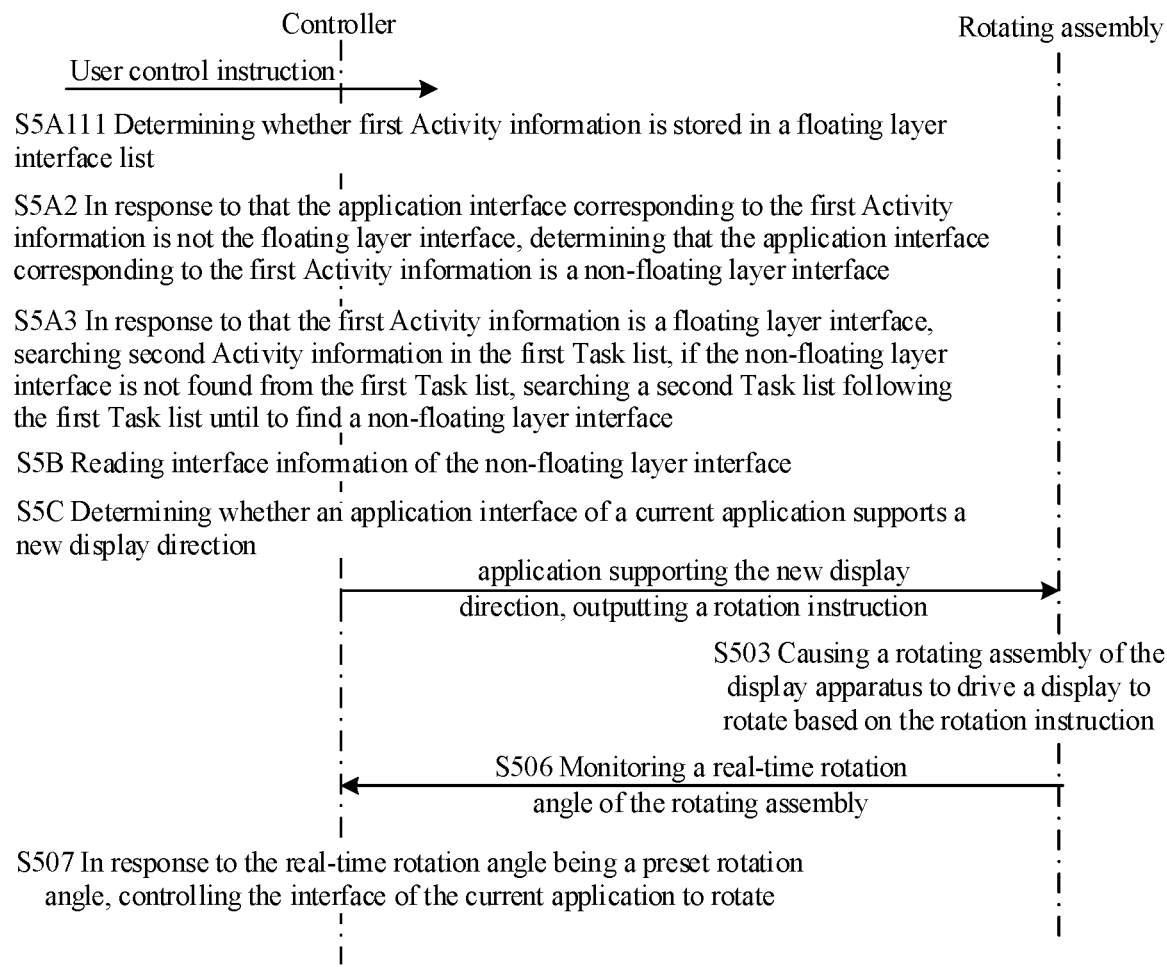
FIG. 18 is a flow chart of a display apparatus according to an embodiment of the present application.

FIG. 18 is an operation flow of the display apparatus according to an embodiment. It can be seen that the controller 250 is further configured to perform the following operations.

S5A111, determining whether the first Activity information is stored in the floating layer interface list, where the floating layer interface list is configured to record Activity information of one or more floating layer interfaces in the display apparatus; if the first Activity information is stored in the floating layer interface list, determining that an application interface corresponding to the first Activity information is the floating layer interface; if the first Activity information is not stored in the floating layer interface list, determining that the application interface corresponding to the first Activity information is the non-floating layer interface.

In the embodiments of the present application, the Activity information of the floating layer interfaces is pre-stored in the floating layer interface list, and the floating layer interface list is stored in a memory. The controller 250 may call the floating layer interface list according to needs in the work process.

It is noted that each application corresponds to a plurality of application interface processes. As for an application, quantity of non-floating layer interfaces is far greater than the quantity of floating layer interfaces. Based on this, the embodiment of the present application generates the floating layer interface list for an application according to the Activity information of the floating layer interfaces of the application. Data recorded in the floating layer interface list are less. On one hand, an available capacity of an internal storage of the display apparatus may be increased, and then a data processing efficiency of the display apparatus is improved. On the other hand, in a process that whether the first Activity information is stored in the floating layer interface list, the controller 250 needs to traverse the floating layer interface list, the data recorded in the floating layer interface list are less, and the corresponding traverse efficiency is improved.

For another example, whether the application interface corresponding to the Activity information is a non-floating layer interface may be determined through an application interface theme of the Activity information.

Figure 19:
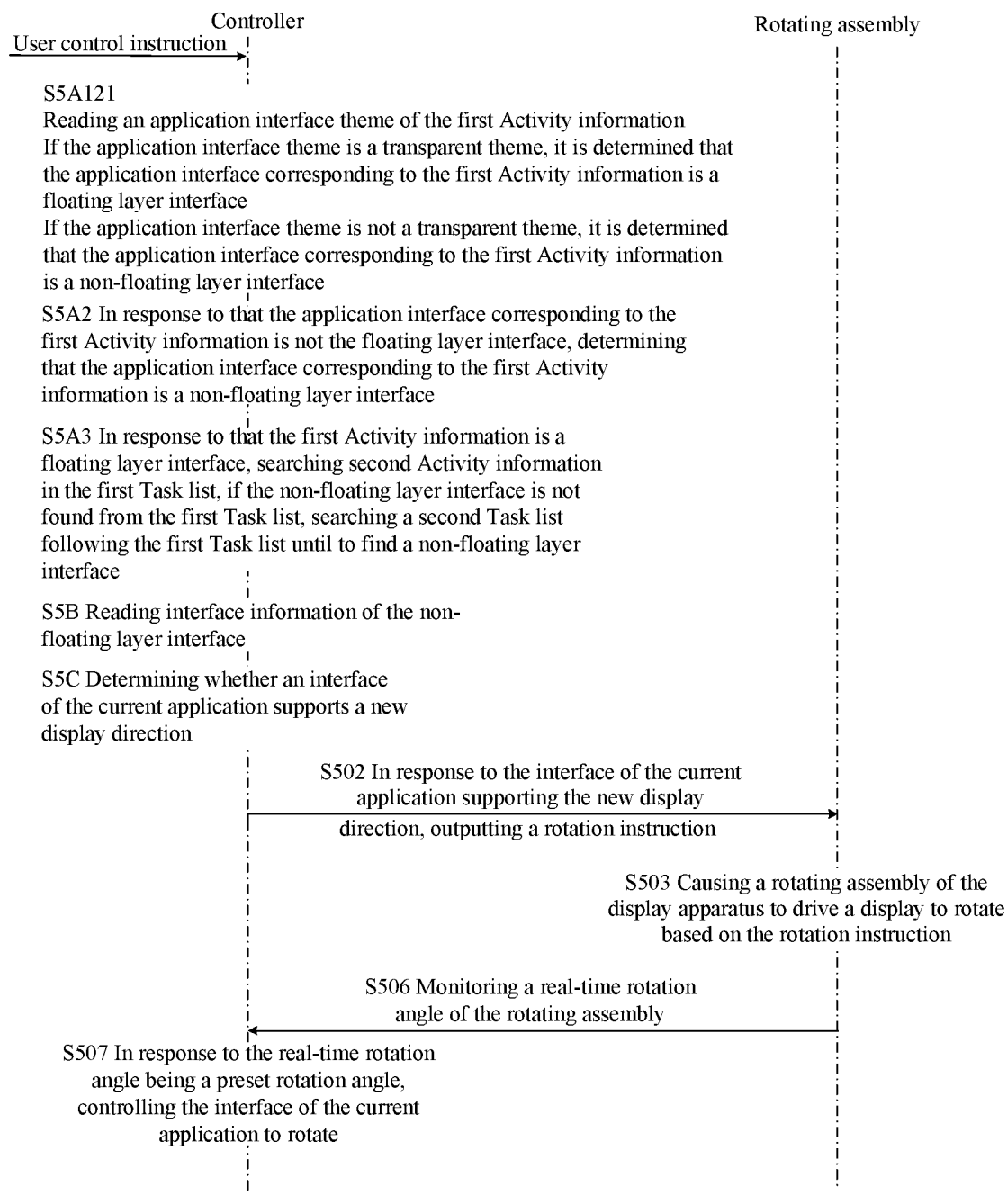
FIG. 19 is a flow chart of a display apparatus according to an embodiment of the present application.

FIG. 19 is a flow chart of the display apparatus according to an embodiment. As shown in FIG. 19, the controller 250 is further configured to perform the following operations.

S5A121, reading an application interface theme of first Activity information.

If the application interface theme is a transparent theme, it is determined that the application interface corresponding to the first Activity information is a floating layer interface.

If the application interface theme is not a transparent theme, it is determined that the application interface corresponding to the first Activity information is a non-floating layer interface.

The application interface theme is recorded in each piece of Activity information, the application interface theme records a value set corresponding to the application interface, and the value set may include values for an application interface style, an application interface title, an application interface transparency, etc. The transparency may include: a layout transparency, an Activity transparency, a color transparency, a background transparency, etc. The controller 250 may determine that the application interface corresponding to the Activity information is the non-floating layer interface according to the value set for the transparency.

S5A2, in response to that the application interface corresponding to the first Activity information is not the floating layer interface, determining that the application interface corresponding to the first Activity information is a non-floating layer interface.

S5A3, in response to that the first Activity information is a floating layer interface, searching second Activity information in the first Task list, if the non-floating layer interface is not found from the first Task list, searching a second Task list following the first Task list until to find a non-floating layer interface.

The second Activity information is information of a second Activity in the first Task list. It is noted that an interface corresponding to an application may include a floating layer interface and a non-floating layer interface, and may also only include the non-floating layer interface. How to determine the non-floating layer interface may refer to the above embodiments.

The non-floating layer interface determined firstly by the controller 250 is an application interface of the current application.

In some embodiments, Task lists running at the front-end of the display apparatus include a Task list 1, a Task list 2 and a Task list 3. Activity information recorded in the Task list 1 may refer to tablet.

TABLE 1

| Serial number | Activity information | Application interface |
|---|---|---|
| 1 | Activity information 1 | Application interface 1 |
| 2 | Activity information 2 | Application interface 2 |
| 3 | Activity information 3 | Application interface 3 |
| 4 | Activity information 4 | Application interface 4 |
| ... | ... | ... |
| n | Activity information n | Application interface 5 |

The controller 250 firstly reads Activity information 1 in the Task list 1 and determines that the Activity information 1 is not stored in a floating layer interface list, and determines that an application interface 1 is a floating layer interface. The controller 250 continues to read Activity information 2 and determine that the Activity information 2 is not stored in the floating layer interface list, and determines that an application interface 2 is a floating layer interface, . . . , in a similar way, until the controller 250 continues to read Activity information n and determine that the Activity information n is not stored in the floating layer interface list, and determines that the application interface n is a floating layer interface. The controller 250 continues to read Activity information in the Task list 2 until the non-floating layer interface is found.

S5B, reading interface information of the non-floating layer interface.

The interface information in the present application includes at least: a page name and an application name. The interface information and the application interface are in one-to-one correspondence.

For example, applications pulling-up or launched by the display apparatus and interface information corresponding to the application are as shown in table 2.

TABLE 2

| Serial number | Application | Application interface | Interface information |
|---|---|---|---|
| 1 | Application 1 | Application interface 1 | Application 1, application interface 1 |
| | | Application interface 2 | Application 1, application interface 2 |
| | | Application interface 3 | Application 1, application interface 3 |
| | | Application interface 4 | Application 1, application interface 4 |
| | | Application interface 1 | Application 2, application interface 1 |
| | | Application interface 2 | Application 2, application interface 2 |
| | | Application interface 3 | Application 2, application interface 3 |
| | | Application interface 4 | Application 2, application interface 4 |
| | | Application interface 5 | Application 2, application interface 5 |
| | | Application interface 1 | Application 3, application interface 1 |
| | | Application interface 2 | Application 3, application interface 2 |

TABLE 2-continued

| Serial number | Application | Application interface | Interface information |
|---|---|---|---|
| | | Application interface 3 | Application 3, application interface 3 |
| ... | ... | ... | ... |
| n | Activity information n | Application interface 1 | Application n, application interface 1 |
| | | Application interface 2 | Application n, application interface 2 |
| | | Application interface 3 | Application n, application interface 3 |
| | | Application interface 4 | Application n, application interface 4 |

It can be seen that the interface information shown in the embodiments of the present application and the application interface are in one-to-one correspondence.

S5C, determining whether the interface of the current application supports a new display direction.

There are various implementation modes for determining whether the application interface of the current application supports the new display direction based on the interface information.

For example, whether the application interface of the current application supports the new display direction may be determined by recognizing configuration information corresponding to the interface information.

Figure 20:
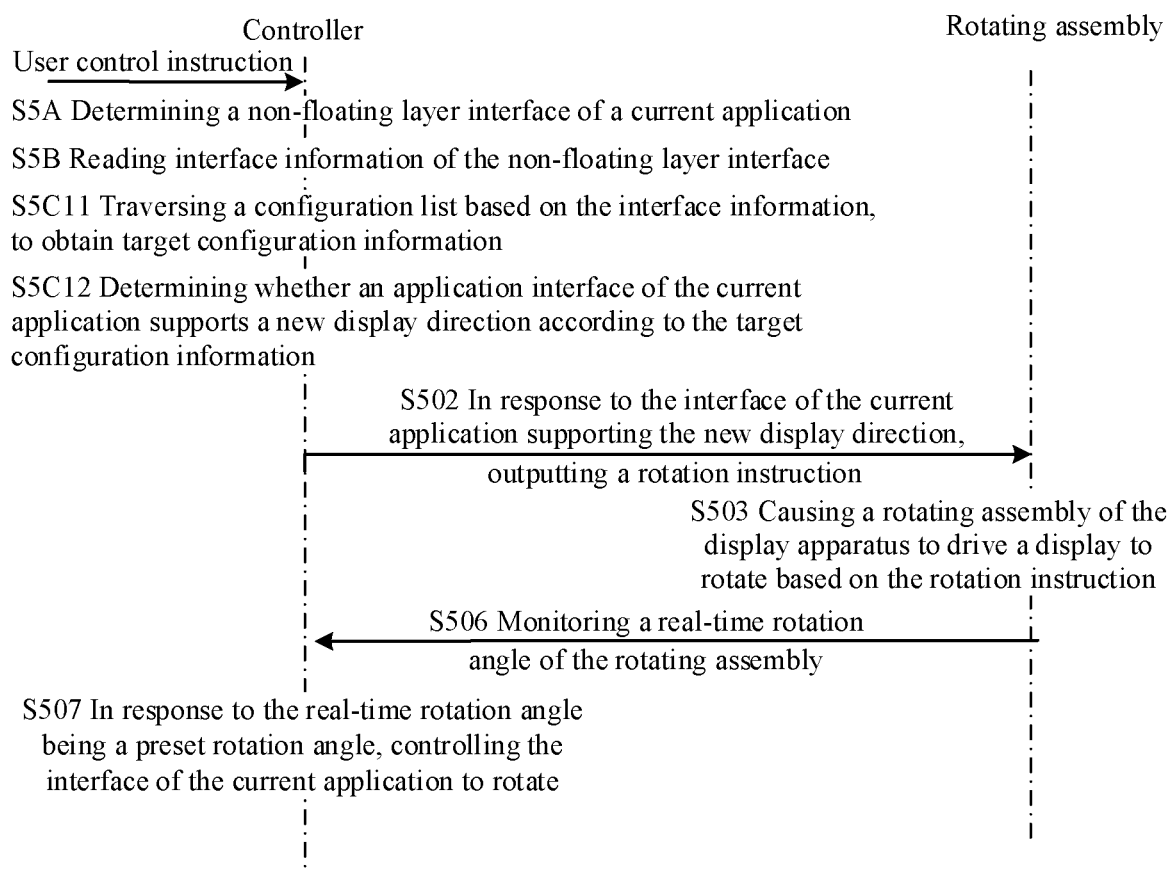
FIG. 20 is a flow chart of a display apparatus according to an embodiment of the present application.

Referring to FIG. 20, which is a flow chart of the display apparatus according to an embodiment. It can be seen that a processor is further configured to perform the operation of traversing a configuration list based on the interface information to obtain target configuration information, where the target configuration information is configuration information of the interface information (S5C11).

The configuration list is configured to record a correspondence relationship between the interface information and the configuration information. Table 3 is a configuration list shown according to an embodiment.

TABLE 3

| Serial number | Interface information | Configuration information |
|---|---|---|
| 1 | Application 1, application interface 1 | Configuration information 11 |
| 2 | Application 1, application interface 2 | Configuration information 12 |
| 3 | Application 1, application interface 3 | Configuration information 13 |
| 4 | Application 1, application interface 4 | Configuration information 14 |
| 5 | Application 2, application interface 1 | Configuration information 21 |
| 6 | Application 2, application interface 2 | Configuration information 22 |
| 7 | Application 2, application interface 3 | Configuration information 23 |
| 8 | Application 2, application interface 4 | Configuration information 24 |
| 9 | Application 2, application interface 5 | Configuration information 25 |
| 10 | Application 3, application interface 1 | Configuration information 31 |
| 11 | Application 3, application interface 2 | Configuration information 32 |

TABLE 3-continued

| Serial number | Interface information | Configuration information |
|---|---|---|
| 12 | Application 3, application interface 3 | Configuration information 33 |
| ... | | |
| n-3 | Application n, application interface 1 | Configuration information n1 |
| n-2 | Application n, application interface 2 | Configuration information n2 |
| n-1 | Application n, application interface 3 | Configuration information n3 |
| n | Application n, application interface 4 | Configuration information n4 |

For the configuration information, Android system is taken as an example, an application interface of each Activity type configures a value for each attribute (namely, configuration information) in a register list file Android-Manifests.xml, wherein configuration attribute "android: screen orientation" is configured to state a screen direction supported by the application interface.

Generally, a default value for the configuration attribute "the screen orientation" is unspecified, which means that the display direction of the application interface is selected according to the system. The direction is determined by the local device. For example, the display apparatus is generally placed horizontally, and the direction is horizontal when the screen orientation configuration attribute is not designated, and for a mobile phone, the default direction is portrait.

The screen orientation configuration attribute may be specified as follows.

Landscape, indicating a mandatory landscape display; it is usually matched with a display apparatus in horizontal state.

Portrait, indicating a mandatory portrait display; it is usually matched with a mobile phone in portrait state.

Behind, indicating being the same as a previous application interface in display direction; and it is matched with a device which supports both landscape and portrait states.

Sensor, indicating rotating to an approaching landscape or portrait display according to a sensor direction; and it is matched with a device which supports both landscape and portrait states.

Sensor Landscape, indicating landscape rotating and only rotating by 180 degrees; and it is usually matched with a display apparatus in landscape.

Sensor Portrait, indicating portrait rotating and only rotating by 180 degrees; and it is usually matched with a mobile phone in portrait.

No sensor, indicating that an application interface will not rotate when the device is rotated; and it is usually matched with the display apparatus in landscape.

User, indicating a direction set by a user; and it is usually matched with a device which supports both the landscape and portrait states.

Products such as the mobile phone and a tablet computer may be used in landscape or portrait, and therefore, the above values may be well determined. But as for a display apparatus which is usually in landscape most of the time, most of application software does not state the display direction attribute, not stating the attribute is more or less equivalent to only supporting the landscape state, namely a mandatory landscape (LandScape). Some applications configure the screen orientation configuration attribute, so that the applications may be adapted to portrait or rotation.

S5C12, determining whether the application interface of the current application supports the new display direction according to the target configuration information.

According to the embodiments of the present application, the controller 250 determines whether an interface of the current application supports the new display direction by reading the screen orientation configuration attribute in the configuration information.

For example, the screen orientation of the current application is configured as Sensor. When the new display direction is the portrait direction, the interface of the current application supports the new display direction.

For another example, the screen orientation of the current application is configured as Landscape. When the new display direction is the portrait direction, the interface of the current application does not support the new display direction.

For example, whether the application interface of the current application supports the new display direction may be determined by recognizing a rotation identifier value in the interface information.

Figure 21:
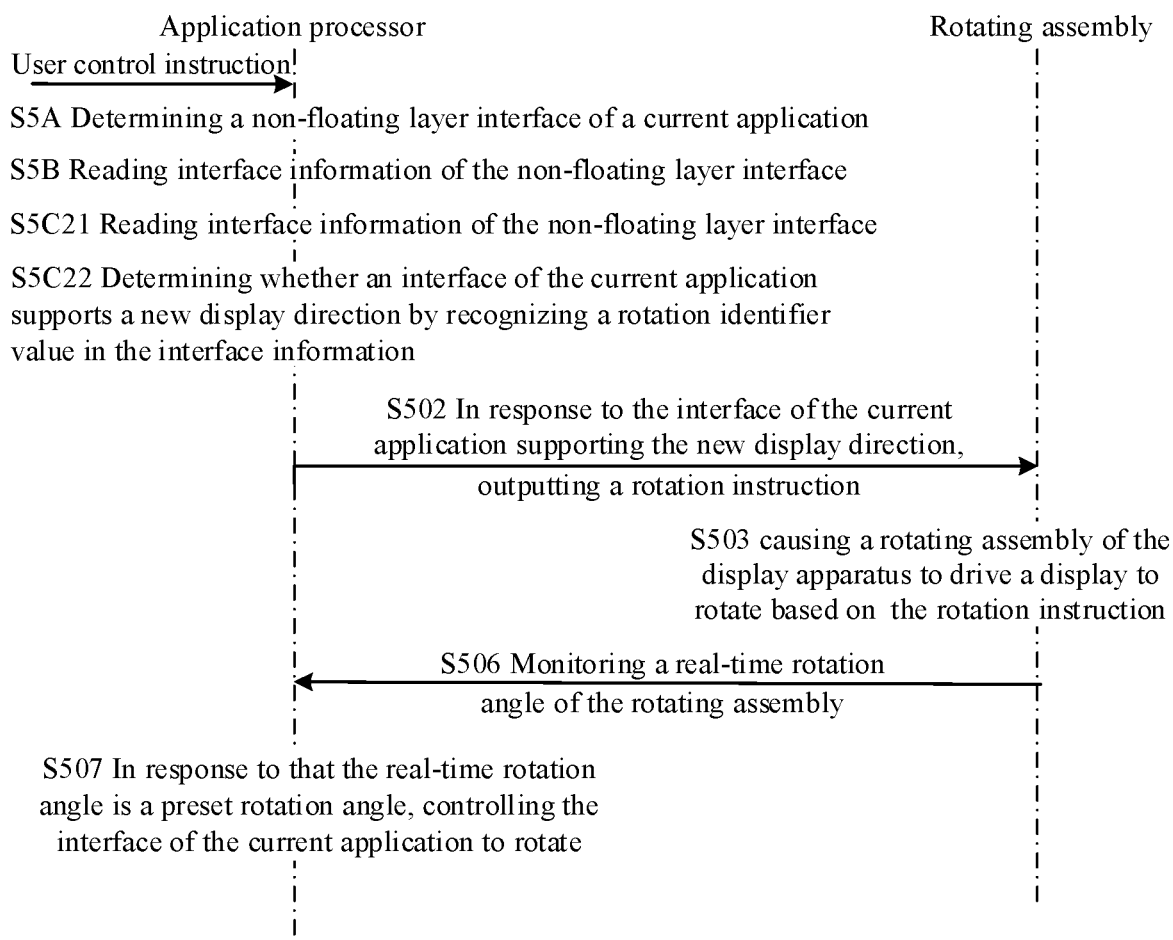
FIG. 21 is a flow chart of a display apparatus according to an embodiment of the present application.

Referring to FIG. 21, it is a flow chart of the display apparatus according to an embodiment. The controller 250 is further configured to perform the following operations.

S5C21, reading interface information of a non-floating layer interface.

How to read the interface information of the non-floating layer interface may refer to the above embodiments.

S5C22, determining whether an interface of the current application supports the new display direction by recognizing the rotation identifier value in the interface information.

In some embodiments, the rotation identifier value is added in the interface information. Whether an interface of the current application supports the new display direction is determined by recognizing the rotation identifier value.

For example, an identifier value: com.android.app, H is added in the interface information. H represents only supporting landscape, V represents only supporting portrait, and HV represents supporting both the landscape and portrait.

Or each application interface states different directions. In this case, a name and format of the specific application interface are written as: application name/application interface name, and a supported direction. For example: com.android.app/.Activity1, H; com.android.app/.Activity2, V.

S502, in response to the interface of the current application supporting the new display direction, outputting a rotation instruction.

S503, causing a rotating assembly of the display apparatus to drive a display to rotate based on the rotation instruction.

S504, in response to the interface of the current application not supporting the new display direction, causing the display to present prompt information, wherein the prompt information is configured to indicate that the interface of the current application does not support the new display direction.

Further, the prompt information is further configured to prompt whether to cancel the rotation instruction for the user.

The controller 250 is further configured to perform S505: in response to receiving an instruction for not cancelling the rotation operation, outputting the rotation instruction to the rotating assembly.

A rotatable television is large in size, and thus a rotation speed is low and usually needs 8-10 seconds to rotate a circle, but rotating of the application interface may be implemented in a really short time. The experience of the user may be improved by determining a proper time point to control the application interface to rotate.

In an embodiment, the controller is further configured to perform the operation of monitoring a real-time rotation angle of the rotating assembly (S506).

It is noted that a monitoring (collecting) process may be done based on the controller. In an embodiment, the collecting process may also be completed based on a monitoring processor in the controller. The above monitoring process may also be completed based on an independently disposed monitor component 277. The monitor component 277 may be a gyroscope, a geomagnetic sensor, an acceleration sensor, or various sensors, etc.

In some embodiments, the monitor component may be the acceleration sensor, and the acceleration sensor collects a real-time rotation angle every 0.2 s.

In the present embodiments, the acceleration sensor records an angle increment of the assembly rotation, and each angle increment recorded by the acceleration sensor corresponds to one real-time rotation angle.

For example, in an initial state, the real-time rotation angle corresponding to the display in the landscape state is "0 degree".

The angle increment sent from the acceleration sensor and received at 0.2 s is "2 degrees", and the corresponding real-time rotation angle is "2 degrees".

The angle increment sent from the acceleration sensor and received at 0.4 s is "2 degrees", and the corresponding real-time rotation angle is "4 degrees".

The acceleration sensor outputs the real-time rotation angle to the controller 250.

In response to the real-time rotation angle being a preset rotation angle, the controller 250 is further configured to perform the operation of controlling the interface of the current application to rotate (S507).

The preset angle may be set according to needs, and in an embodiment, the preset angle may be 45 degrees. When the real-time angle received from the controller 250 is 45 degrees, the controller 250 controls the interface of the application to rotate.

The above calculating process may be done based on the controller. In embodiments, the above calculating process may also be done based on an application processor in the controller.

The present application shows and provides an interface display method of a display apparatus in real time and the display apparatus. The display apparatus includes: a display; a controller, wherein the controller is configured to: in response to receiving a command for rotating a display of the display apparatus input from a user, determine whether an interface of a current application supports a new display direction, wherein the new display direction is a display direction after a rotation based on the command; if the interface of the current application supports the new display direction, output a rotation instruction; and control the display to present prompt information in response to the interface of the current application not supporting the new display direction, wherein the prompt information is configured to prompt that the interface of the current application does not support the new display direction; and a rotating assembly, configured to drive the display to rotate based on the rotation instruction. Based on the present application, the controller firstly determines whether an interface of the current application supports the new display direction, and output the rotation instruction if supporting, so that the rotating assembly may drive the display to rotate based on the rotation instruction; and control the display to present the prompt information if not supporting, so that the user may select whether to continue to control the display to rotate according to actual needs. It can be seen that the display apparatus according to the embodiments of the present application provides more options for the user, and the user may select whether to continue to control the display to rotate according to the actual needs, thereby improving the user experience.

The present application further provides a computer readable non-volatile storage medium. The medium may store instructions. When executed, the instructions may cause a computer to perform the embodiments of the present application.

What is claimed is:

1. A display apparatus, comprising:
a display;
a rotating assembly, in connection with the display, and configured to drive the display to rotate to a rotation state, where the rotation state comprises a horizontal state, a portrait state and at least one intermediate state during rotation of the display except the horizontal state and the portrait state; and
a controller, in communication with the display and the rotating assembly and configured to:
in response to starting an application in the display apparatus, detect a display direction supported by the application and a current rotation state of the display;
in response to the display direction supported by the application being consistent with the current rotation state, control the display to present an application page of the application;
in response to the display direction supported by the application being inconsistent with the current rotation state, cause the rotating assembly to drive the display to rotate to enable a rotation state of the display to be consistent with the display direction supported by the application; and
in response to receiving a command input for rotating the display to a first rotation state, determining, before driving the display to rotate, whether an interface of the application supports the first rotation state, wherein
the interface of the application includes a floating layer interface and a non-floating layer interface, and the controller is further configured to:
determine the non-floating layer interface of the application,
read interface information of the non-floating layer interface,
determine whether the non-floating layer interface of the application supports the first rotation state of the display after the display is rotated, and
in response to the non-floating layer interface supporting the first rotation state, output a rotation instruction to the rotating assembly to rotate the display.

2. The display apparatus according to claim 1, wherein the controller is further configured to:
during rotation of the display, control the display to present a first rotation animation before presenting the application page of the application, wherein an animation page of the first rotation animation is an axisymmetric page.

3. The display apparatus according to claim 2, wherein the controller is further configured to:
count a display time of the first rotation animation during rotation of the display;
in response to the display time being equal to a preset time, cancel the first rotation animation; and control the display to present the application page of the application.

4. The display apparatus according to claim 1, wherein the controller is further configured to:
   during rotation of the display, monitor rotating information of the rotating assembly;
   configure a second rotation animation based on the rotating information, to enable the second rotation animation to keep relative still with the rotation of the display, wherein an animation page of the second rotation animation is a non-axisymmetric page; and
   control the display to present the animation page of the second rotation animation.

5. The display apparatus according to claim 4, wherein the controller is further configured to:
   control the rotating assembly to drive the display to rotate towards a first direction, and control the second rotation animation to rotate according to a second direction, to enable the second rotation animation to keep relative still with the rotation of the display, wherein the first direction and the second direction are correlated.

6. The display apparatus according to claim 5, wherein the rotating information of the rotating assembly comprises a rotating angle of the rotating assembly, and the controller is further configured to:
   in response to the rotating angle being equal to a preset angle, cancel the second rotation animation; and
   control the display to present the application page of the application.

7. The display apparatus according to claim 1, wherein the controller is further configured to:
   read a display direction identifier of the application;
   in response to the display direction identifier being a first direction identifier, determine that the display direction supported by the application is a landscape display direction; and
   in response to the display direction identifier being a second direction identifier different from the first direction, determine that the display direction supported by the application is a portrait display direction.

8. The display apparatus according to claim 1, wherein the non-floating layer interface is an interface that the application displays characteristics and constructs functions, and the non-floating layer interface occupies an overall display interface in a display process.

9. The display apparatus according to claim 1, wherein the controller is further configured to:
   obtain first Activity information from a first Task list at a front-end of the display apparatus;
   determine whether the first Activity information is the floating layer interface by reading a list of floating layer interfaces which records Activity information of floating layer interfaces;
   in response to the first Activity information being not the floating layer interface, determine an interface corresponding to the first Activity information as the application page of the application; and
   in response to the first Activity information being the floating layer interface, obtain second Activity information from the first Task list and determine whether the second Activity information is a floating layer by reading the list of floating layer interfaces.

10. The display apparatus according to claim 1, wherein the floating layer interface refers to a temporary interface for launching the application on a page for realizing suggestive or context-related tasks.

11. An interface display method for a display apparatus, comprising:
    in response to starting an application in the display apparatus, detecting a display direction supported by the application and a current rotation state of a display of the display apparatus, wherein the display apparatus comprises a rotating assembly configured to drive the display to rotate to a rotation state, where the rotation state comprises a horizontal state, a portrait state and at least one intermediate state during rotation of the display except the horizontal state and the portrait state;
    in response to the display direction supported by the application being consistent with the current rotation state, controlling the display to present an application page of the application;
    in response to the display direction supported by the application being inconsistent with the current rotation state, causing the rotating assembly of the display apparatus to drive the display to rotate to enable a rotation state of the display to be consistent with the display direction supported by the application; and
    in response to receiving a command input for rotating the display to a first rotation state, determining, before driving the display to rotate, whether an interface of the application supports the first rotation state, wherein the interface of the application includes a floating layer interface and a non-floating layer interface,
    the method further including:
        determining the non-floating layer interface of the application,
        reading interface information of the non-floating layer interface,
        determining whether the non-floating layer interface of the application supports the first rotation state of the display after the display is rotated, and
        in response to the non-floating layer interface supporting the first rotation state, outputting a rotation instruction to the rotating assembly to rotate the display.

12. The method according to claim 11, further comprising:
    during rotation of the display, controlling the display to present a first rotation animation before presenting the application page of the application, wherein an animation page of the first rotation animation is an axisymmetric page.

13. The method according to claim 12, further comprising:
    counting a display time of the first rotation animation during rotation of the display;
    in response to the display time being equal to a preset time, cancelling the first rotation animation; and
    controlling the display to present the application page of the application.

14. The method according to claim 11, further comprising:
    during rotation of the display, monitoring rotating information of the rotating assembly;
    configuring a second rotation animation based on the rotating information, to enable the second rotation animation to keep relative still with the rotation of the display, wherein an animation page of the second rotation animation is a non-axisymmetric page; and
    controlling the display to present the animation page of the second rotation animation.

15. The method according to claim 14, further comprising:

controlling the rotating assembly to drive the display to rotate towards a first direction; and controlling the second rotation animation to rotate according to a second direction, to enable the second rotation animation to keep relative still with the rotation of the display, wherein the first direction and the second direction are correlated.

16. The method according to claim 15, wherein the rotating information of the rotating assembly comprises a rotating angle of the rotating assembly, and the method further comprises:

in response to the rotating angle being equal to a preset angle, cancelling the second rotation animation; and controlling the display to present the application page of the application.

17. The method according to claim 11, further comprising:

reading a display direction identifier of the application;

in response to the display direction identifier being a first direction identifier, determining that the display direction supported by the application is a landscape display direction; and in response to the display direction identifier being a second direction identifier different from the first direction, determining that the display direction supported by the application is a portrait display direction.

18. The method according to claim 11, wherein the non-floating layer interface is an interface that the application displays characteristics and constructs functions, and the non-floating layer interface occupies an overall display interface in a display process.

19. The method according to claim 11, wherein the method further comprises:

obtaining first Activity information from a first Task list at a front-end of the display apparatus;

determining whether the first Activity information is the floating layer interface by reading a list of floating layer interfaces which records Activity information of floating layer interfaces;

in response to the first Activity information being not the floating layer interface, determining an interface corresponding to the first Activity information as the application page of the application; and in response to the first Activity information being the floating layer interface, obtaining second Activity information from the first Task list and determining whether the second Activity information is a floating layer by reading the list of floating layer interfaces.

20. A non-transitory computer storage medium, wherein the computer storage medium stores computer instructions which are configured to cause the computer to:

in response to starting an application in a display apparatus, detect a display direction supported by the application and a current rotation state of a display of the display apparatus, wherein the display apparatus comprises a rotating assembly configured to drive the display to rotate to a rotation state, where the rotation state comprises a horizontal state, a portrait state and at least one intermediate state during rotation of the display except the horizontal state and the portrait state;

in response to the display direction supported by the application being consistent with the current rotation state, control the display to present an application page of the application;

in response to the display direction supported by the application being inconsistent with the current rotation state, cause the rotating assembly of the display apparatus to drive the display to rotate to enable a rotation state of the display to be consistent with the display direction supported by the application; and in response to receiving a command input for rotating the display to a first rotation state, determine, before driving the display to rotate, whether an interface of the application supports the first rotation state, wherein the interface of the application includes a floating layer interface and a non-floating layer interface, and the computer is further configured to:

determine the non-floating layer interface of the application, read interface information of the non-floating layer interface, determine whether the non-floating layer interface of the application supports the first rotation state of the display after the display is rotated, and in response to the non-floating layer interface supporting the first rotation state, output a rotation instruction to the rotating assembly to rotate the display.

* * * * *